United States Patent
Yankilevich et al.

(10) Patent No.: US 12,381,711 B2
(45) Date of Patent: *Aug. 5, 2025

(54) ENCRYPTION SYSTEM AND METHOD

(71) Applicant: Microsoft Technology Licensing, LLC, Redmond, WA (US)

(72) Inventors: Yevgeny Yankilevich, Tirat Carmel (IL); Vadim Makhervaks, Bellevue, WA (US); Yi Yuan, Redmond, WA (US); Robert Groza, Jr., Redmond, WA (US); Oren Ish-Am, Haifa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 315 days.

This patent is subject to a terminal disclaimer.

(21) Appl. No.: 18/066,955

(22) Filed: Dec. 15, 2022

(65) Prior Publication Data

US 2024/0007268 A1 Jan. 4, 2024

Related U.S. Application Data

(63) Continuation-in-part of application No. 17/804,083, filed on May 25, 2022, now Pat. No. 12,111,774.

(51) Int. Cl.
*H04L 9/06* (2006.01)

(52) U.S. Cl.
CPC .................. *H04L 9/0631* (2013.01)

(58) Field of Classification Search
CPC ... H04L 9/0631; H04L 9/0637; G06F 21/602; G06F 21/79
See application file for complete search history.

(56) References Cited

U.S. PATENT DOCUMENTS

| | | | |
|---|---|---|---|
| 11,552,782 B2 | 1/2023 | Mishra | |
| 2011/0123020 A1 | 5/2011 | Choi | |
| 2011/0255689 A1* | 10/2011 | Bolotov | H04L 9/0631 380/42 |
| 2014/0223197 A1* | 8/2014 | Gueron | H04L 9/3242 713/193 |

(Continued)

FOREIGN PATENT DOCUMENTS

WO 2019243047 A1 12/2019

OTHER PUBLICATIONS

Luther Martin, XTS: A Mode of AES for Encrypting Hard Disks, Computer and Reliability Societies, IEEE (Year: 2010).*

(Continued)

*Primary Examiner* — Shanto Abedin
(74) *Attorney, Agent, or Firm* — Alleman Hall & Tuttle LLP

(57) ABSTRACT

A computing system uses Advanced Encryption Standard XEX Based Tweaked Codebook Mode with Ciphertext Stealing (AES-XTS) encryption to encrypt a block of data using a tweak key, a data key, a modified tweak value, and the block of data to thereby generate an encrypted block of data. The modified tweak value is computed according to the expression DEC(0, CONST KEY), where DEC is an AES decryption algorithm, and CONST KEY is the tweak key. The encrypted block of data is thereby formatted according to the Advanced Encryption Standard with no extended mode and not according to the XEX Based Tweaked Codebook Mode with Ciphertext Stealing.

18 Claims, 14 Drawing Sheets

EMULATION OF ELECTRONIC CODE BOOK (ECB) MODE OF AES DECRYPTION USING AN AES-XTS DECRYPTION MODULE

(56) References Cited

U.S. PATENT DOCUMENTS

| | | | |
|---|---|---|---|
| 2015/0261965 A1* | 9/2015 | Brumley | G06F 21/602 |
| | | | 713/193 |
| 2016/0182223 A1 | 6/2016 | Kishinevsky et al. | |
| 2016/0364343 A1 | 12/2016 | Case | |
| 2019/0097789 A1 | 3/2019 | Rangayyan | |
| 2021/0200880 A1* | 7/2021 | Khosravi | G06F 21/79 |
| 2023/0325326 A1* | 10/2023 | Balakrishnan | G06F 12/1408 |
| | | | 713/193 |

OTHER PUBLICATIONS

Mohammad A. Alomari et al, A Framework for GPU-accelerated AES-XTS Encryption in Mobile Devices, TENCON (Year: 2011).*

Demir, et al., "Optimizing dm-crypt for XTS-AES: Getting the Best of Atmel Cryptographic Co-processors", In Proceedings of the 17th International Joint Conference On E-Business And Telecommunications, Jan. 1, 2020, pp. 263-270.

"International Search Report and Written Opinion Issued in PCT Application No. PCT/US23/017034", Mailed Date: Jun. 23, 2023, 11 Pages.

"International Search Report and Written Opinion Issued in PCT Application No. PCT/US23/017244", Mailed Date: Jun. 27, 2023, 13 Pages.

Non-Final Office Action mailed on Jan. 4, 2024, in U.S. Appl. No. 17/804,083, 12 pages.

Martin, et al., "XTS: A mode of AES for encrypting hard disks," IEEE Security & Privacy, 2010, pp. 68-69.

Notice of Allowance mailed on Jun. 6, 2024, in U.S. Appl. No. 17/804,083, 18 pages.

* cited by examiner

CONVENTIONAL ART: SERIAL AES-XTS ENCRYPTION FOR STREAMS

CONVENTIONAL ART: CONTINUOUS ENCRYPTION USING AES-XTS BLOCK CIPHER MODE WITH CIPHERTEXT STEALING

ENCRYPTION

DECRYPTION

EMULATION OF ELECTRONIC CODE BOOK (ECB) MODE OF AES
ENCRYPTION USING AN AES-XTS ENCRYPTION MODULE

EMULATION OF ELECTRONIC CODE BOOK (ECB) MODE OF AES ENCRYPTION USING AN AES-XTS ENCRYPTION MODULE, DURING INCREMENTAL ENCRYPTION

EMULATION OF ELECTRONIC CODE BOOK (ECB) MODE OF AES DECRYPTION USING AN AES-XTS DECRYPTION MODULE

EMULATION OF ELECTRONIC CODE BOOK (ECB) MODE OF AES DECRYPTION USING AN AES-XTS DECRYPTION MODULE, DURING INCREMENTAL DECRYPTION

ENCRYPTION SYSTEM AND METHOD

CROSS REFERENCE TO RELATED APPLICATIONS

This application is a continuation-in-part of U.S. application Ser. No. 17/804,083, filed May 25, 2022, the entire disclosure of which is hereby incorporated herein by reference for all purposes.

BACKGROUND

Storage level encryption is the use of encryption to encrypt data stored in storage media. Data is encrypted while writing to storage devices, such as individual hard disks, tape drives, etc. The use of storage level encryption helps ensure that sensitive information is protected from unauthorized access even when at rest on storage media. The Advanced Encryption Standard XEX Based Tweaked Codebook Mode with Ciphertext Stealing (AES-XTS) algorithm is one approach that has been used for storage level encryption. Recently, as streaming data has become more prevalent in networked computing environments, AES-XTS has been adapted to provide continuous encryption for incoming data streams when written into storage media. However, conventional implementations of the AES-XTS algorithm for continuous encryption of data streams encrypt data serially for each stream, which can result in processing delays when encrypting multiple data streams, as discussed below. A technical challenge exists in addressing such processing inefficiencies.

As AES-XTS encryption hardware and software have become widely implemented, there has arisen the practical problem of performing AES encryption with no extended mode of operation, as for example may be requested by legacy code in encrypting single blocks or multiple blocks of data. When legacy code built to implement AES encryption prior to the introduction of XTS is run on a computer that has dedicated hardware configured only to perform AES-XTS encryption, unexpected errors can occur because the AES-XTS algorithm is not the same as using the AES algorithm. Providing separate hardware configured to perform AES encryption with no extended mode of operation in order to support such legacy code in modern machines that also include an AES-XTS module would be impractical and cost prohibitive.

SUMMARY

To address the issues discussed above, an encryption computing system is provided comprising processing circuitry configured to execute an Advanced Encryption Standard XEX Based Tweaked Codebook Mode with Ciphertext Stealing (AES-XTS) encryption subsystem configured to encrypt a block of data using an AES-XTS encryption module configured to receive as inputs a tweak key, a data key, a modified tweak value, and the block of data, to thereby generate an encrypted block of data. The modified tweak value is computed according to the expression DEC (0, CONST KEY). DEC is an AES decryption algorithm, and CONST KEY is a constant and the tweak key. The encrypted block of data is thereby formatted according to the Advanced Encryption Standard with no extended mode and not according to the XEX Based Tweaked Codebook Mode with Ciphertext Stealing.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
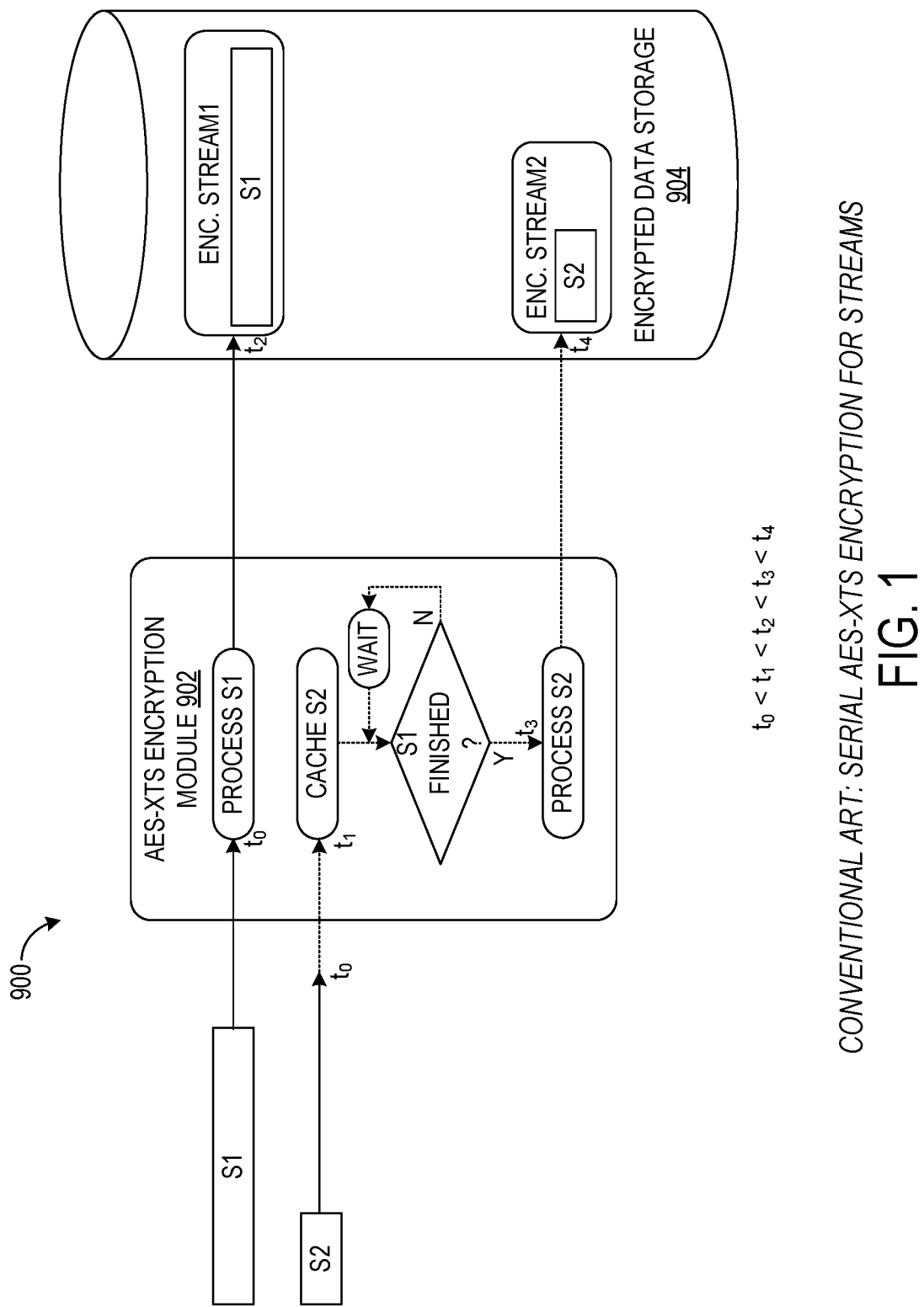
FIG. 1 is a general schematic diagram illustrating conventional art, namely, serial AES-XTS encryption for streams.

Referring to FIG. 1, a schematic diagram of a conventional serial encryption system 900 is depicted. A first data stream S1 is inputted into the AES-XTS encryption module 902 at time t0. The AES-XTS module may be configured to operate according to the example standard architecture set forth in the current version of Institute of Electrical and Electronics Engineers (IEEE) P1619. The second data stream S2 is inputted into the AES-XTS encryption module 902 at time t1. As a serial encryption process, the first data stream S1 and the second data stream S2 are not processed at the same time. The first data stream S1 is processed continuously up to completion, and then the resulting encrypted stream is saved into encrypted data storage 904 at time t2. Between time t0 and time t2, the second data stream S2 cannot be processed by the AES-XTS encryption module 902. In this example, the second data stream S2 is cached into data cache S2 at time t1, and then the AES-XTS encryption module 902 waits for the first data stream S1 to be fully processed before the encrypted data stream S1 is stored in the encrypted data storage 904 at time t2 before processing of the second data stream S2 can start at time t3 and finish at t4.

Figure 2:
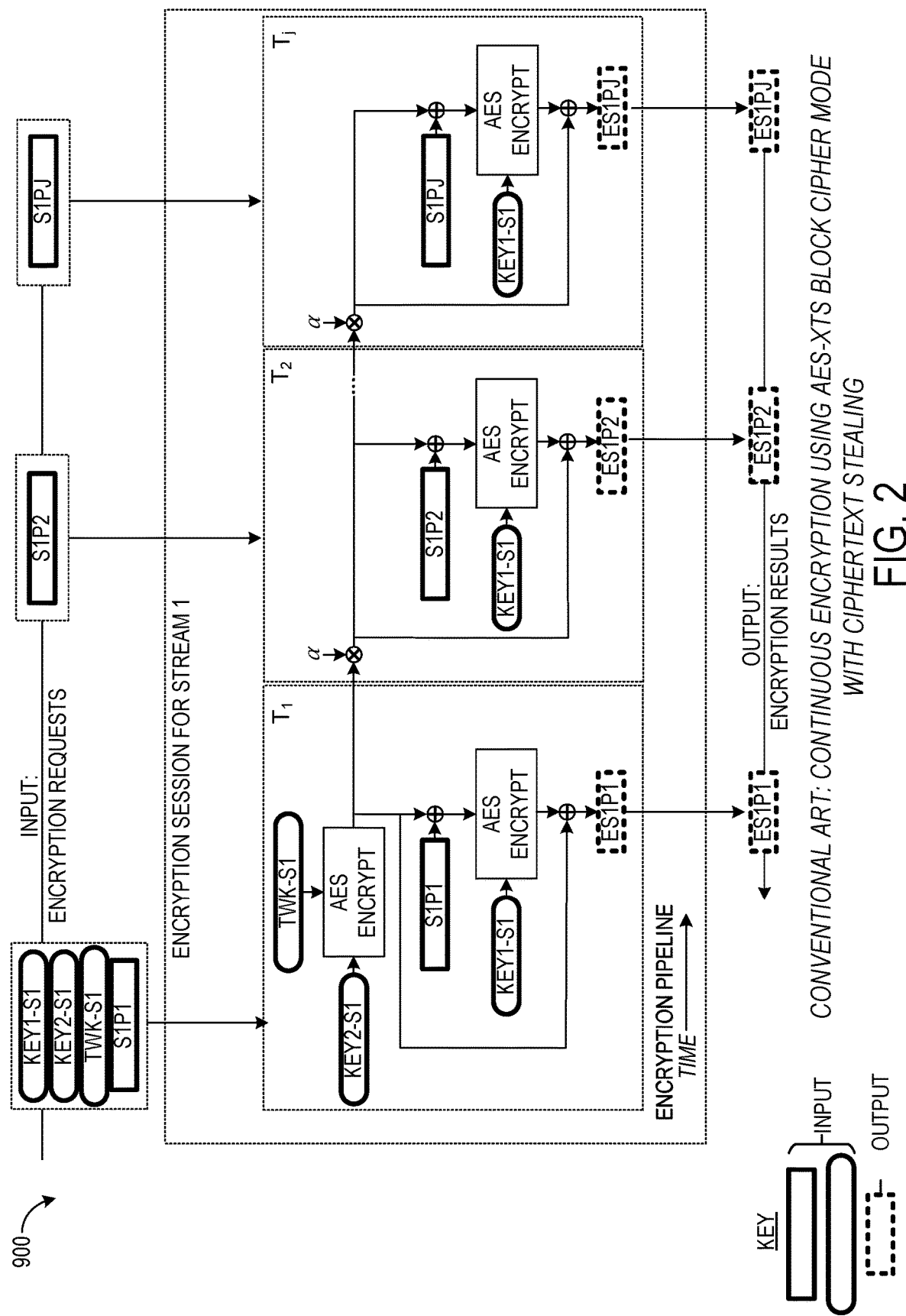
FIG. 2 is a schematic flow diagram illustrating details of the conventional serial AES-XTS encryption of FIG. 1, namely, use of continuous encryption using AES-XTS block cipher mode for streams.

Referring to FIG. 2, a flow diagram is depicted showing operations of the conventional encryption system of FIG. 1 using continuous encryption with AES-XTS block cipher mode. Here, the circles with the X inside indicate multiplication over a Galois field, and the circles with the plus symbol inside indicate addition over a Galois field. An encryption session for the processing of the first data stream S1 is divided into blocks $T_1$, $T_2$, $T_j$, each block dedicated to encrypting a different part of the first data stream S1. In this example, the first data stream S1 is divided into three parts: a first part S1P1, a second part S1P2, . . . and a jth part S1PJ, processed in the first block T1, second block T2, . . . and jth block Tj, respectively. Encryption requests incorporating each part of the first data stream S1 are inputted for each block. In the last and penultimate cipher blocks, a ciphertext-stealing technique (not shown) may be used, in which part of an encrypted output of the penultimate block is stored, and then concatenated with the part of the data stream of the last cipher block that is encrypted in the last cipher block.

In this example, the first encryption request includes a first key KEY1-S1 also referred to as a data key, a second key KEY2-S1 also referred to as a tweak key, a tweak value TWK-S1, and data forming the first part of the first stream S1P1, which may be a first packet or group of packets of data. The tweak value TWK-S1 is an initial tweak value that is provided to the AES-XTS algorithm that is used in the encryption of the data. One example of a value that can be used as the tweak value is a Logical Block Address (LBA) in memory at which encrypted data will be stored. However, it will be appreciated that other values besides LBA may be used for the tweak value depending on the application. As shown in this example, the modular product of a modular multiplication performed between α, a primitive element of a Galois field, and the encrypted result of the AES-XTS encryption of the tweak value TWK-S1 using the second key KEY2-S1, of a previous block is used for the encryption in the current block. For example, the modular product from T1 is used in the encryption of the second part S1P2 in the second block T2. FIGS. 1 and 2 demonstrate a downside of the conventional serial encryption system 900, in that all the blocks in the encryption session for the first stream S1 must be completed before an encryption session for a second stream S2 can be started, which causes processing delays for the second stream S2.

Figure 3A:
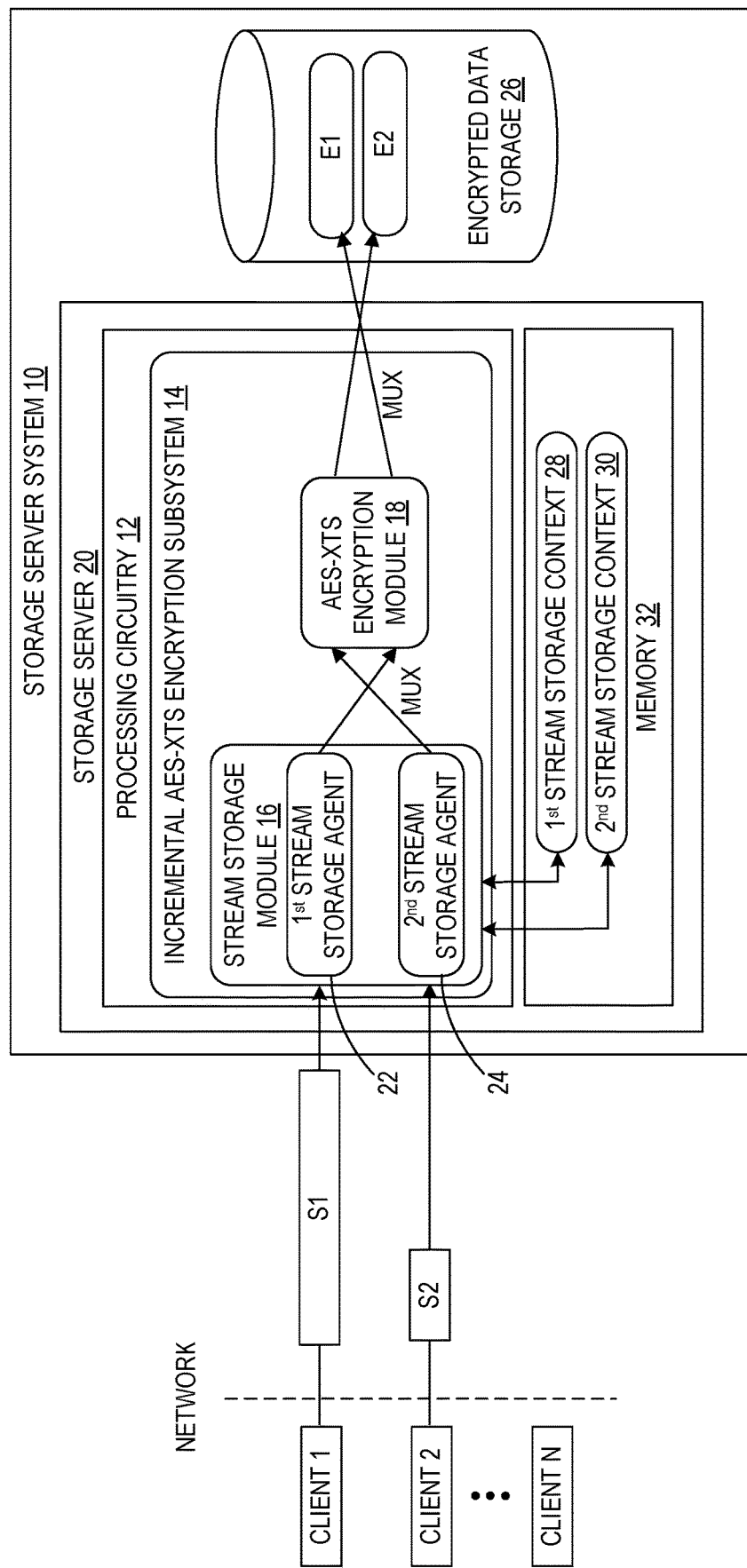
FIG. 3A is a schematic diagram illustrating a computing system in accordance with a first example of the present disclosure.

Referring to FIG. 3A, a storage server system 10 is depicted in accordance with a first example of the present disclosure. The storage server system 10 is a computing system comprising processing circuitry 12 configured to execute an incremental AES-XTS encryption subsystem 14, which executes a stream storage module 16 and an AES-XTS encryption module 18, which may be implemented in software or hardware. In this example, the processing circuitry 12 is provided in a storage server 20 of the storage server system 10.

In this example, clients 1 and 2 each send respective streams S1 and S2 to the storage server 20 for storage in encrypted form. The stream storage module 16 listens for incoming streams and when data for a stream arrives for storage, instantiates a stream storage agent 22 that is assigned the role of handling the encryption and storage of the incoming stream. In the depicted example, client 1 sends a first data stream S1 to a first data stream storage agent 22 of the stream storage module 16 as a first storage request, and client 2 sends a second data stream S2 via the network to a second data stream storage agent 24 of the stream storage module 16 as a second storage request. The data may travel over a network such as a wide area network (e.g., the Internet), local area network (e.g., a data center fabric), or a server-to-server connection (e.g., top-of-rack switch), for example. Further, in some examples the clients 1, 2 may be executed within the same physical or virtualized compute node as the stream storage module 16, and thus communications from the clients 1, 2 may not traverse any network. As data arrives it is queued by each stream storage agent 22, 24, and each stream storage agent 22, 24 send encryption requests to the AES-XTS encryption module 18 to encrypt the queued stream data that has arrived. The first and second stream storage agents 22, 24 of the stream storage module 16 interleave, i.e., multiplex, a first set of encryption requests to encrypt parts of the first data stream S1 with a second set of second encryption requests to encrypt parts of the second data stream S2 over a data connection to the AES-XTS encryption module 18, as indicated by MUX in FIG. 3A.

The stream storage module 16 transmits the requests in an interleaved manner to the AES-XTS encryption module 18, which processes the interleaved encryption requests serially in an order received to thereby encrypt parts of the first data stream S1 and second data stream S2 in an incremental manner until both streams are fully processed and encrypted. As result, the first encrypted stream E1 and the second encrypted stream E2 are outputted from the incremental AES-XTS encryption subsystem 14 and stored in encrypted data storage 26. As each part of each stream is encrypted serially by the AES-XTS encryption module 18, the respective part is outputted to a storage location over a connection to the encrypted data storage 26 in an interleaved, i.e., multiplexed manner, as also indicated by MUX in FIG. 3A, rather than waiting for all parts of the entire stream to be encrypted before storing the stream on the encrypted data storage 26. Interleaving the encrypted parts of the streams sent to the encrypted data storage 26 in this manner further avoids processing delays and minimizes memory usage (i.e., queue sizes) within the incremental AES-XTS encryption sub system 14.

The incremental AES-XTS encryption subsystem 14 is further configured to store a first data stream storage context 28 and a second data stream storage context 30 in memory 32. The first data stream storage context 28 includes the tweak key, the last block index J, and the data key for the first data stream S1. Since first data stream S1 is incrementally encrypted part-by-part across multiple encryption sessions of the AES-XTS encryption module 18, the first data stream storage context 28 is updated to include the contextual data associated with each encryption session. Similarly, the second data stream storage context 30 includes the tweak key, the last block index J, and the data key for the second data stream S2. For each of the first and second data streams S1, S2, the respective stream storage agent 22, 24 stores values for the corresponding stream storage context 28, 30 after completing an initial encryption session for the first part of each stream S1, S2. As subsequent parts of each stream S1, S2 are received by the stream storage agents 22, 24 of the incremental AES-XTS encryption subsystem 14, each stream storage agent 22, 24 reads and retrieves the stored stream storage context 28, 30 to continue incremental encryption of the respective stream S1, S2. Thus, following the encryption session for the initial part of the first data stream S1, the first stream storage agent 22 of the incremental AES-XTS encryption subsystem 14 reads and retrieves the first data stream storage context 28 prior to starting a subsequent encryption session for a next part of the first data stream S1. Similarly, following the encryption session for the initial part of the second data stream S1, the second data stream storage agent 24 of the incremental AES-XTS encryption subsystem 14 also reads and retrieves the stored second data stream storage context 30 prior to starting a subsequent encryption session for a next part of the second data stream S2. It will be appreciated that, although two data streams are depicted in FIG. 3A, the number of data streams is not particularly limited, and thus multiple streams including three more data streams may be interleaved in different use applications.

Figure 3B:
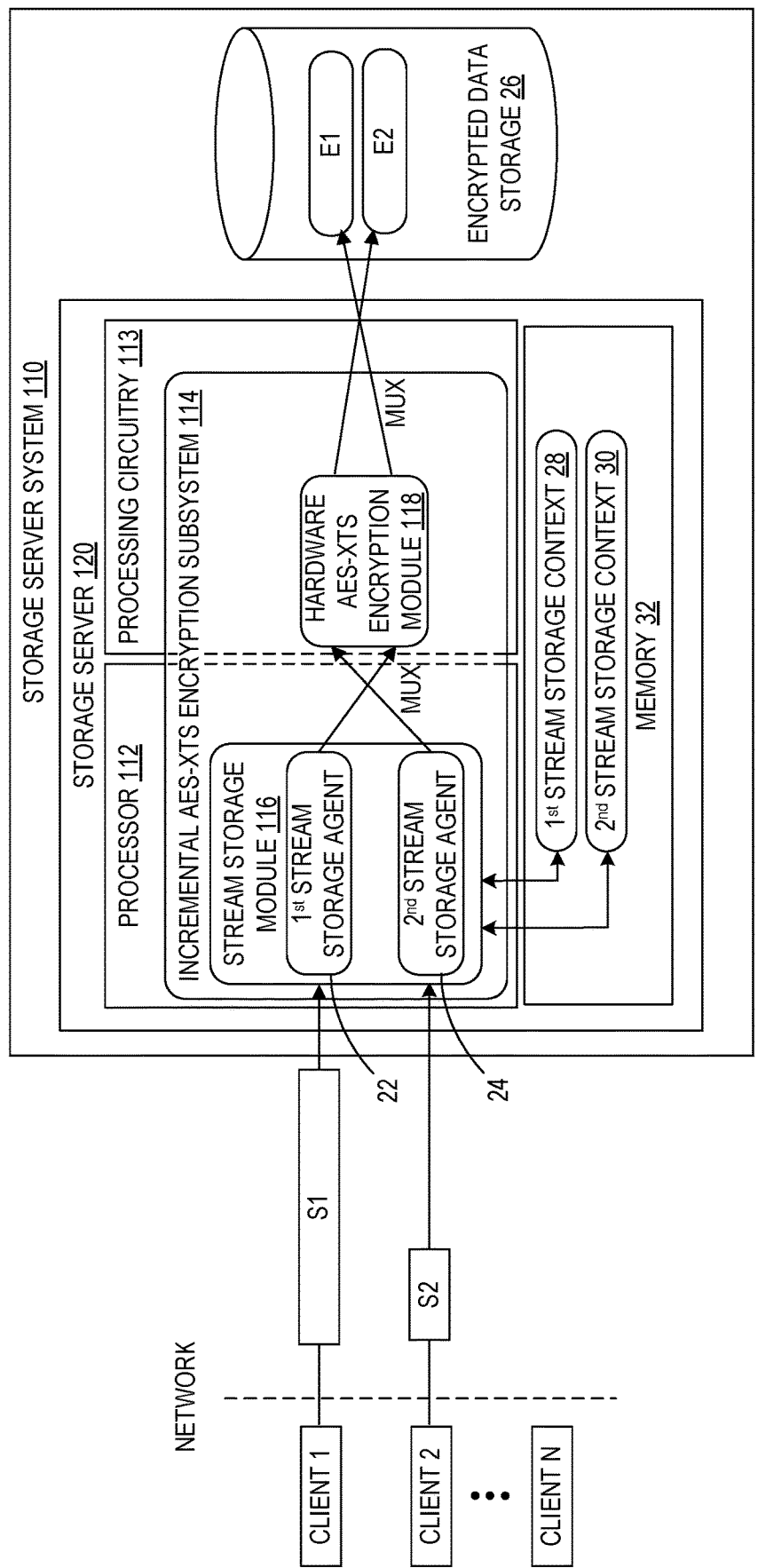
FIG. 3B is a schematic diagram illustrating a computing system in accordance with a second example of the present disclosure.

Referring to FIG. 3B, a storage server system 110 is depicted in accordance with a second example of the present disclosure. Like parts in this example are numbered similarly to the first example and share their functions, and will not be described again except as below for the sake of brevity. In the second example, the AES-XTS encryption module 118 of the incremental AES-XTS encryption subsystem 114 of the storage server 120 is implemented in hardware in processing circuitry 113 which is a separate processing unit from the processor 112 that executes the stream storage module 116. The processing circuitry 113 implementing the hardware AES-XTS encryption module 118 is not particularly limited, and may be a field-programmable array (FPGA), program- and application-specific integrated circuits (PASIC/ASICs), or graphics processing units (GPU), for example. In some embodiments the processing circuitry 113 may be formed as an integrated system-on-chip together with processor 112. In other embodiments, the processing circuitry 113 and processor 112 may be formed as separate chips mounted on the same printed circuit board and linked by a data bus or mounted on different printed circuit boards and linked by an interconnect, for example.

Figure 4A:
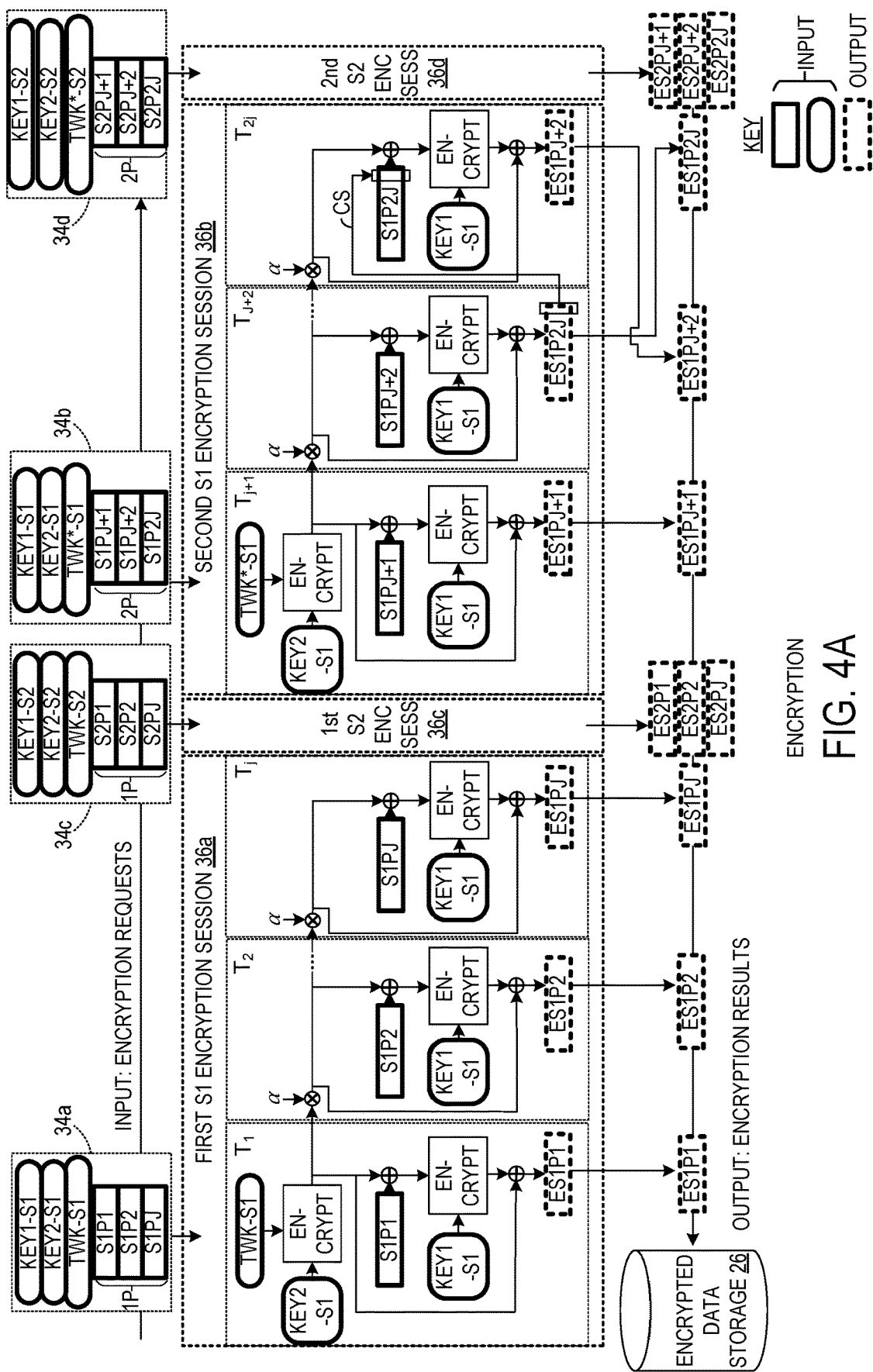
FIG. 4A is a schematic diagram illustrating the data flows through the AES-XTS encryption module of the computing system of FIG. 3A or 3B when operated in an encryption mode, in which each encryption session processes one or more parts of a respective data stream in an interleaved manner.
Figure 6:
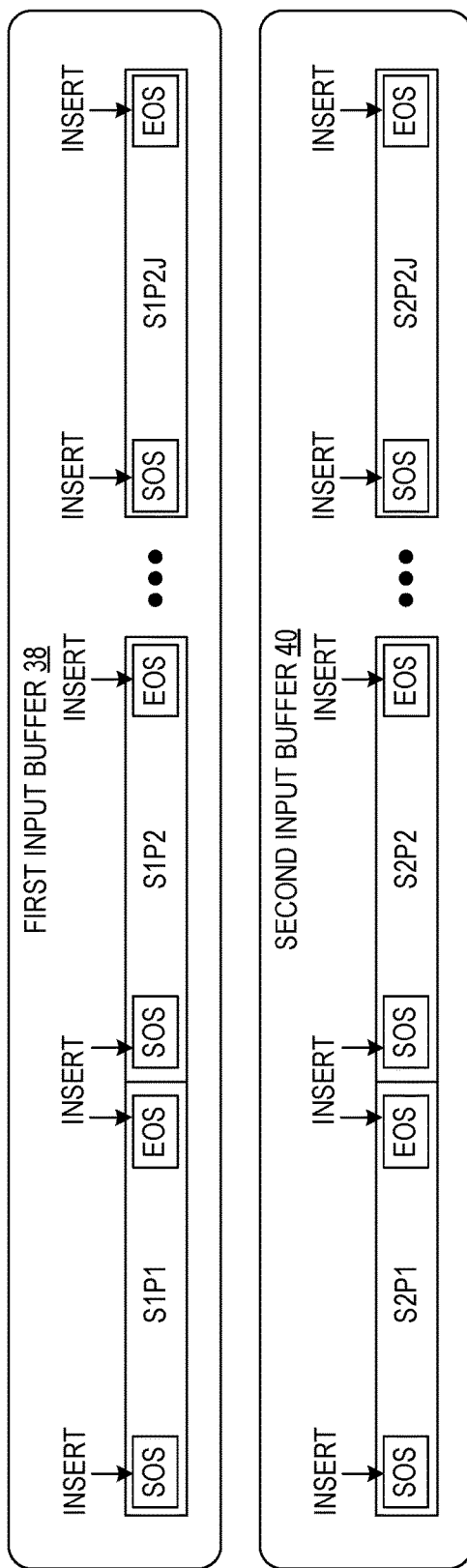
FIG. 6 is a detailed schematic diagram of the first and second input buffers of FIG. 5.

Referring to FIG. 4A, a detailed depiction of the data flows through the AES-XTS encryption module 18 when operated in an encryption mode is shown in accordance with the first or second example of the present disclosure. The AES-XTS encryption module 18 receives as encryption input 34a a data key (KEY1-S1), a tweak key (KEY2-S1), a tweak value (TWK-S1), and data of a first part 1P (including subparts S1P1, S1P2 through S1PJ) of a first data stream S1, in a first S1 encryption session 36a. The AES-XTS encryption module 18 then encrypts the subparts S1P1, S1P2 through S1PJ of the first part 1P of the first data stream S1 via three cipher blocks labeled with block indices $T_1$, $T_2$ and $T_J$, respectively, thereby generating the encrypted first part including encrypted subparts ES1P1, ES1P2, ES1PJ of the first stream S1. Typically, ciphertext stealing is not used to encrypt the first part (e.g., is not used in cipher block $T_2$ or $T_j$). The AES-XTS encryption module 18 subsequently terminates the first S1 encryption session 36a for the first part 1P of S1, and stores the generated encrypted first part (including encrypted subparts ES1P1, ES1P2, ES1PJ) of S1 in an encrypted data storage 26. Although the data flow is shown traveling directly from the AES-XTS encryption module 18 to the encrypted data storage 26, in some examples such as shown in FIG. 6, the AES-XTS encryption module 18 may return the encrypted data to the stream storage module 16, prior to storage of the encrypted data on the encrypted data storage 26.

After termination of the first S1 encryption session 36a, the encryption subsystem 14 is configured to implement a first S2 encryption session 36c. Like for the first stream S1, the AES-XTS encryption module 18 receives as encryption input 34c a tweak key (KEY2-S2), a data key (KEY1-S2), a tweak value (TWK-S2), and data of a first part 1P (including subparts S2P1, S2P2 through S2PJ) of a second data stream S2, in the first S2 encryption session 36c. The AES-XTS encryption module 18 then encrypts the first part 1P of the second data stream S2, thereby generating the encrypted first part (including encrypted subparts ES2P1, ES2P2 through ES2PJ) of the second data stream S2. The AES-XTS encryption module 18 subsequently terminates the first S2 encryption session 36c for the first part 1P of the second data stream S2, and stores the generated encrypted first part 1P of the second data stream S2 in the encrypted data storage 26.

Continuing with FIG. 4A, after the termination of the first S2 encryption session 36c, the AES-XTS encryption module 18 receives and encrypts a second part 2P of the first data stream S1 in a second S1 encryption session 36b commenced after the termination of the first S2 encryption session 36c, and also following the termination of the first S1 encryption session 36a. The second part 2P (including subparts S1PJ+1, S1PJ+2 through S1P2J) of the first data stream S1 is encrypted using the tweak key (KEY2-S1), the data key (KEY1-S1), a modified tweak value (TWK*-S1) based on the block index value of cipher block $T_J$ of the first encryption session 36a, and data of the second part 2P (including subparts S1PJ+1, S1PJ+2 through S1P2J) as encryption input 34b to thereby generate an encrypted second part (including encrypted subparts ES1PJ+1, ESPJ+2 through ESP2J), which is subsequently stored in the encrypted data storage 26. Ciphertext stealing may be utilized on the penultimate and last cipher blocks of the second S1 encryption session, as illustrated schematically at CS. Typically, ciphertext stealing is only used in the penultimate and last cipher text blocks (e.g., $T_{J+2}$ and $T_{2J}$ in this example) of a last part (the second part 2P in this example) of the stream (S1 in this example) being encrypted, and is not used to encrypt a first part (e.g., 1P) or intermediate part of the stream. It will be appreciated that for a first part 1P of a data stream, a tweak value is provided by a tweak value generator 48 using an initial tweak value such as the LBA discussed above, and is coupled with a tweak key and data key obtained from a key generator 46 (shown in FIG. 5), and with plaintext data to be encrypted that has been received from the client, to form a complete set of encryption input. For subsequent parts of the data stream, a modified tweak value TWK* may be computed by the tweak value generator 48 (shown in FIG. 5). The manner of computation of the modified tweak value LBA*(1) is described further with reference to FIG. 7 below.

After the termination of the first S2 encryption session 36c and the second S1 encryption session 36b, the AES-XTS encryption module 18 is configured to implement a second S2 encryption session 36d. The encryption module 18 receives and encrypts a second part S2P2 of the second data stream S2 in a second S2 encryption session 36d commenced after the termination of the first S2 encryption session 36c. The second part 2P (including subparts S2PJ+1, S2PJ+2 through S2P2J) of the second data stream S2 is encrypted using the tweak key (KEY2-S2), the data key (KEY1-S2), a modified tweak value (TWK*-S2) computed based on the index of the last cipher block of the first S2 encryption session 36c, and data of the second part 2P as encryption input 34d to thereby generate an encrypted second part 2P (including encrypted subparts ES2PJ+1, ES2PJ+2 through ES2P2J), which is subsequently stored in the encrypted data storage 26.

In this manner, a single stream may be broken into multiple parts and each part may be encrypted in a separate encryption session by the encryption module 18, with continuity between the parts of a stream retained during the encryption process by virtue of computation of the modified tweak value TWK* based on the index of the last cipher block of the previous part of the stream. The resulting encrypted data stored in encrypted data storage 26 is thus indistinguishable from data stored in a single encryption session. However, processing delays associated with serial encryption discussed above, can be avoided, thereby improving the computational efficiency and user experience of the encryption process.

Figure 4B:
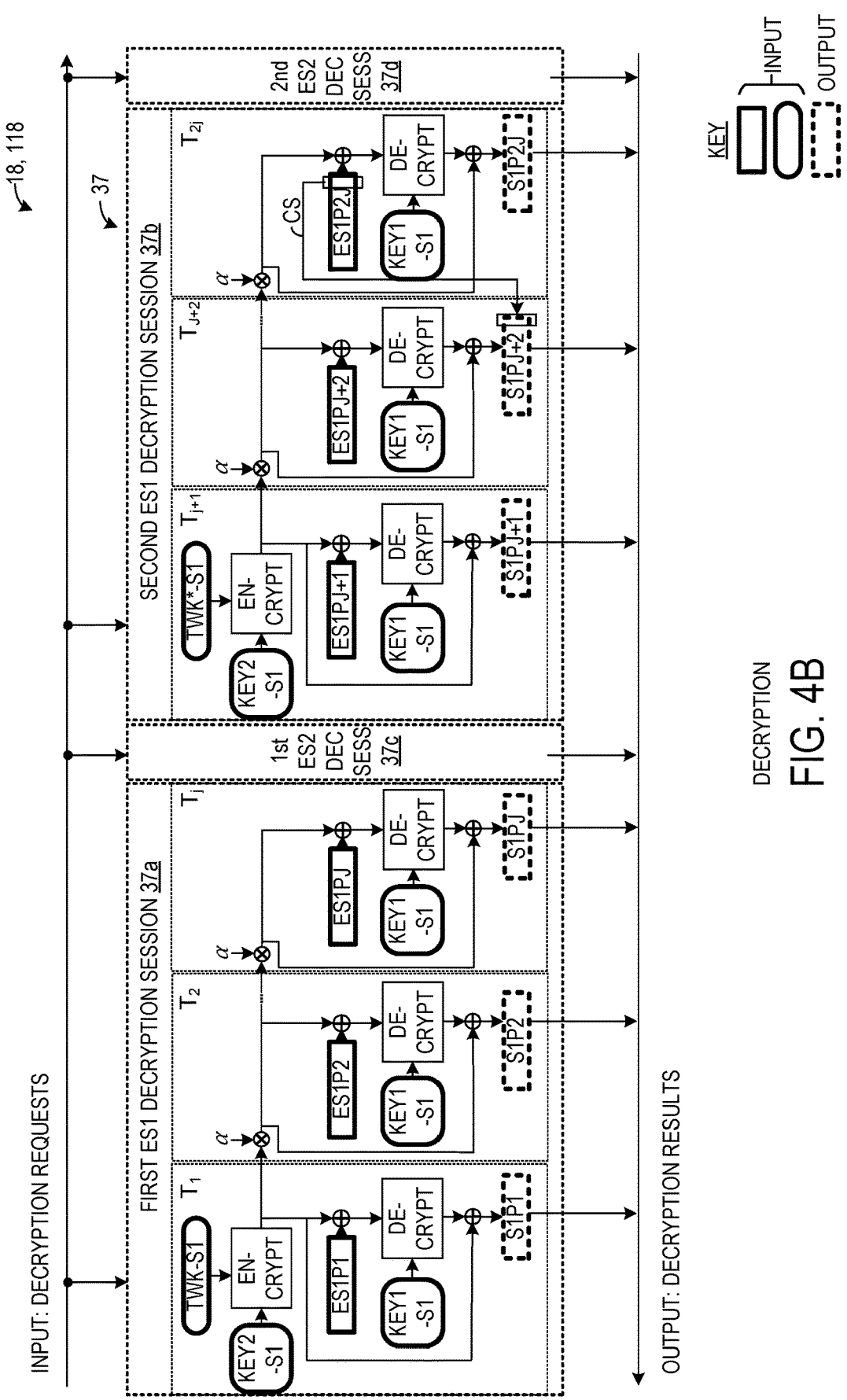
FIG. 4B is a schematic diagram illustrating the data flows through the AES-XTS encryption module of the computing system of FIG. 3A or 3B when operated in a decryption mode, in which each decryption session processes one or more parts of a respective data stream in an interleaved manner.

Turning now to FIG. 4B, data flows are illustrated through the AES-XTS encryption module 18, 118 of the computing system of FIG. 3A or 3B when operated in a decryption mode. As input, a plurality of decryption requests for a plurality of encrypted data streams, such as encrypted first stream ES1 and encrypted second stream ES2, are received at the AES-XTS encryption module 18, 118 from the stream storage module 16, 116 in a request order. The decryption requests for a first part and a second part of each of the first and encrypted streams are interleaved similarly to the encryption requests described above. The decryption requests are processed serially in the order received by the encryption module 18, 118, in a corresponding plurality of decryption sessions 37. Four decryption sessions are illustrated, namely, first ES1 decryption session 37a, first ES2 decryption session 37c, second ES1 decryption session 37b, and second ES2 decryption session 37d. In first ES1 decryption session 37a, the first part of the first encrypted stream ES1 is decrypted in a series of j cipher blocks, using the tweak value TWK-S1, tweak key KEY2-S1, data key KEY1-S1 and the ciphertext ES1P1, ES1P2, . . . ES1PJ, according to the AES-XTS decryption logic schematically illustrated in FIG. 4B. In cipher block TT, which is the last cipher block of the first ES1 decryption session 37a, ciphertext stealing is not applied. Then, the first ES2 decryption session 37c is implemented, followed by the second ES1 decryption session. In the second ES1 decryption session, a second part of the first encrypted stream ES1 is decrypted using a modified tweak value TWK*-S1, the tweak key KEY2-S1, data key KEY1-S1, and the ciphertext ES1PJ+1, ES1PJ+2, . . . ES1P2J, according to the according to the illustrated AES-XTS decryption logic. The modified tweak value TWK*-S1 is computed as described elsewhere herein. Note that decryption techniques for ciphertext stealing CS may be applied to the penultimate and last cipher blocks in the last part (second part in this example) of the first encrypted stream ES1, since the last part has been encrypted using ciphertext stealing techniques. In this way, the first and second encrypted streams ES1, ES2 may be decrypted by sending decryption requests for each encrypted stream ES1, ES2 in an interleaved manner to the AES module 18, 118, thereby reducing processing delays associated with requiring the decryption of an entire encrypted stream before decrypting a next encrypted stream.

Figure 5:
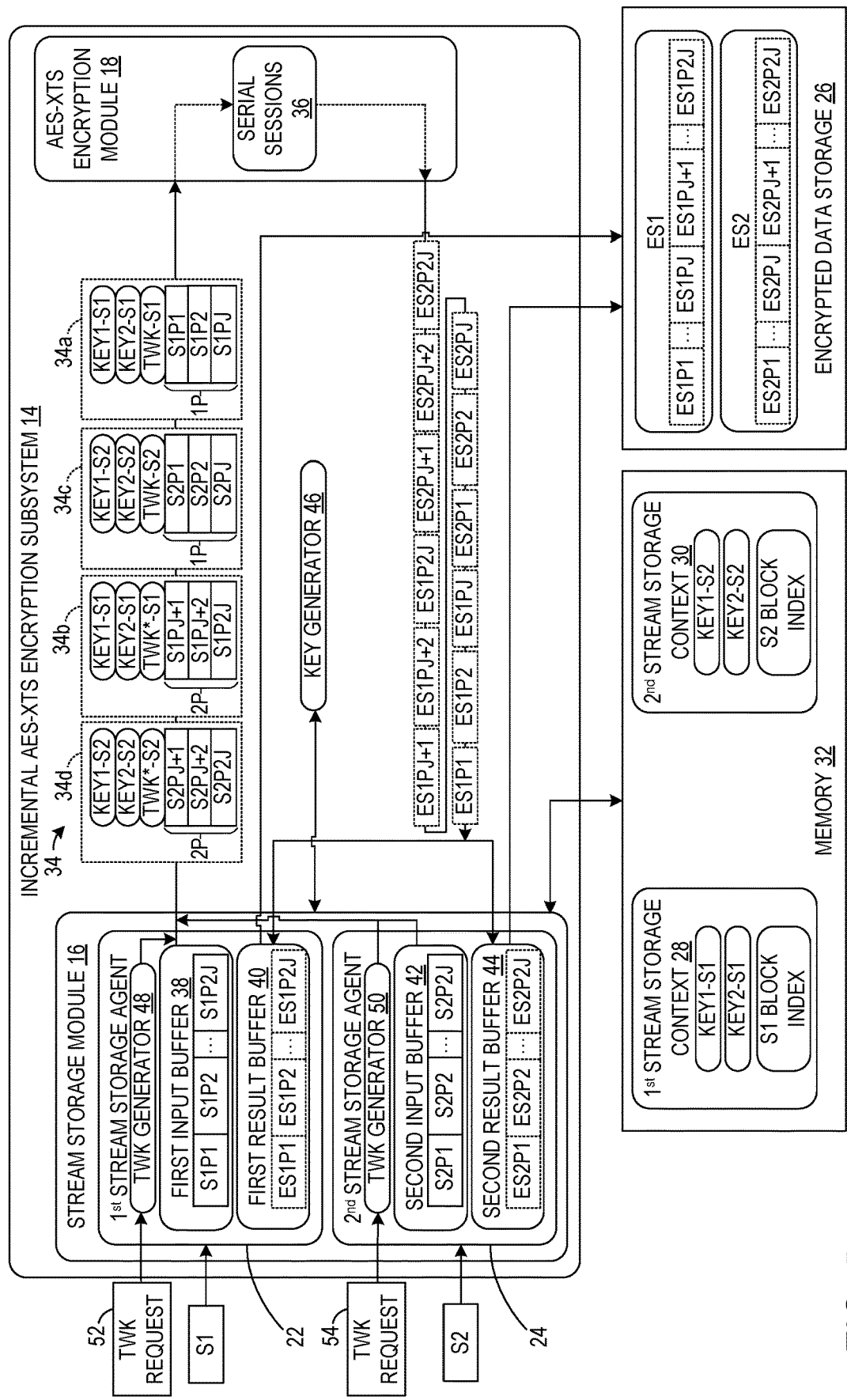
FIG. 5 is a detailed schematic diagram of the data flows through the stream storage module and the AES-XTS encryption module of FIG. 3A or 3B.

Referring to FIG. 5 a detailed depiction of the data flows through the stream storage module 16 and the AES-XTS encryption module 18 of the first or second examples is shown, for the encryption process described in FIG. 4A when the system is operated in an encryption mode. The first data stream S1 is input into a first data stream storage agent 22 of the stream storage module 16, and a second data stream S2 is inputted into a second data stream storage agent 24 of the stream storage module 16. The first data stream storage agent 22 is configured to receive the first data stream S1 and divide the first data stream S1 into a plurality of parts and subparts. For example, S1 may be divided into a first part 1P including subparts S1P1, S1P2 through S1PJ, and a second part 2P including subparts S1PJ+1, S1PJ+2, S1P2J. It will be noted that the cipher block indexes of the last subpart of the first part (J) and the first subpart of the second part (J+1) of the first stream are consecutive. Further, the same number of cipher blocks are typically included in each of the first part and second parts, thus accounting for the labeling of S1P2J, where 2J indicates a cipher block index of 2J for the last block in the second part of the first stream.

The second data stream storage agent 24 is configured to receive the second data stream S2 and divide the second data stream S2 into a plurality of parts and subparts. For example, S2 may be divided into a first part 1P including subparts S2P1, S2P2 through S2PJ, and a second part 2P including subparts S2PJ+1, S2PJ+2, S2P2J. It will be noted that the cipher block indexes of the last subpart of the first part and the first subpart of the second part of the second stream are also consecutive. It will be appreciated that the first data stream storage agent 22 and the second data stream storage agent 24 may be instantiated only while the stream storage module 16 is receiving data streams S1, S2, and terminated upon completion of the encryption of the data streams S1, S2.

The stream storage module 16 is configured to interleave first data stream encryption requests 34a, 34b, for encryption of the first part 1P (including subparts S1P1, S1P2 through S1PJ) and second part 2P (including subparts S1PJ+1, S1PJ+2 through S1P2J) of the first data stream S1, stored in a first input buffer 38 of the first data stream storage agent 22, and second data stream encryption requests 34c, 34d for encryption of the first part 1P (including subparts S2P1, S2P2 through S2PJ) and second part 2P (including subparts S2PJ+1, S2PJ+2 through S2P2J) of the second data stream S2, stored in a second input buffer 42 of the second data stream storage agent 24, together over a connection to the AES-XTS encryption module 18.

Here, the stream storage module 16 is configured to interleave first data stream encryption requests 34a, 34b to encrypt the first and second parts 1P, 2P of the first data stream S1 and second data stream encryption requests 34c, 34d to encrypt first and second parts 1P, 2P of the second data stream S2 over a connection to the AES-XTS encryption module 18, and send the interleaved encryption requests for the first and second parts 1P, 2P to the AES-XTS encryption module 18. The method of interleaving two or more data streams together is not particularly limited, and various orderings of the different parts of different data streams may be implemented.

Responsive to receiving the interleaved encryption requests 34a-d, the AES-XTS encryption module 18 is configured to process the plurality of encryption requests 34a-d serially in an order received, so as to encrypt the different streams S1, S2 over multiple serial encryption sessions 36, and send the encrypted stream including encrypted subparts ES1P1, ES1P2, ES1PJ, ES2P1, ES2P2, ES2PJ, ES1PJ+1, ES1PJ+2, ES1P2J, ES2PJ+1, ES2PJ+2, ES2P2J, to the stream storage module 16, so that the encrypted first data stream ES1 (ES1P1, ES1P2, ES1PJ, ES1PJ+1, ES1PJ+2, ES1P2J) is stored in the first result buffer 40 of the first data stream storage agent 22, and the encrypted second data stream ES2 (ES2P1, ES2P2, ES2PJ, ES2PJ+1, ES2PJ+2, ES2P2J) is stored in the second result buffer 44 of the second data stream storage agent 24. While three blocks are illustrated in each encryption session for ease of illustration, it will be appreciated that the precise number of blocks may vary depending on the implementation.

In this example, the encrypted subparts ES1P1, ES1P2, ES1PJ, ES2P1, ES2P2, ES2PJ, ES1PJ+1, ES1PJ+2, ES1P2J, ES2PJ+1, ES2PJ+2, ES2P2J are interleaved responses to the encryption requests 34a-d, so that the encrypted parts ES1P1, ES1P2, . . . ES1P2J of the first data stream S1 are interleaved with the encrypted parts ES2P1, ES2P2, . . . ES2P2J of the second data stream S2. The stream storage module 16 is configured to receive these interleaved responses to the encryption requests 34a-2 and coordinate their storage on encrypted data storage 26.

The incremental AES-XTS encryption subsystem 14 also includes a key generator 46. The stream storage module 16 sends a request to the key generator 46 to retrieve a tweak key (KEY2) and a data key (KEY1). The first stream storage agent 22 may also be provided with a first tweak value generator 48, and the second data stream storage agent 24 may also be provided with a second tweak value generator 50. A user may send a first tweak value request 52 to the first tweak value generator 48, which generates and outputs a tweak value corresponding to a sequential number of a part of the first data stream S1. For example, a sequential number of a first part of a data stream is one, a sequential number of a second part of a data stream is two, and a sequential number of a third part of a data stream is three. The tweak values (TWK-S1, TWK*-S1) are generated by the first tweak value generator 48 for the first part and second part of the first data stream S1, respectively. Other tweak values may be generated for subsequent parts of each stream. The initial tweak value TWK-S1 may be provided by the user in the first tweak value request 52 as an arbitrary 128-bit nonnegative integer, or the initial tweak value TWK-S1 may simply be set by the user as zero. The modified tweak value TWK* computation methodology is described in detail elsewhere herein.

A user may also send a second tweak value request 54 to the second tweak value generator 50, which generates and outputs a tweak value corresponding to a sequential number of a part of the second data stream S2, so that the tweak values (TWK-S2, TWK*-S2) are generated by the second tweak value generator 50 for the first part and second part of the second data stream S2, respectively. Subsequent parts may receive additional tweak values. The initial tweak value LBA-S2 may be provided by the user in the second tweak value request 54 as an arbitrary 128-bit nonnegative integer, or the initial tweak value LBA-S2 may simply be set by the user as zero. The modified tweak value TWK* computation methodology is described in detail elsewhere herein.

The incremental AES-XTS encryption subsystem 14 is further configured to store in memory 32 a first data stream storage context 28 for the first data stream S1 and a second data stream storage context 30 for the second data stream S2. The first data stream storage context 28 includes the tweak key (KEY2-S1) and the data key (KEY1-S1) generated by the key generator 46. The second data stream storage context 30 includes the tweak key (KEY2-S2) and the data key (KEY1-S2) generated by the key generator 46. The stream storage module 16 is further configured to store the S1 block index and S2 block index corresponding to a block index value for a last cipher block processed by the AES-XTS encryption module 18. In this way, the first and second stream storage contexts 28, 30 contain data that can be used to reconstruct an appropriate modified tweak value and resume encryption of a previously interrupted stream.

Referring to FIG. 6, a detailed illustration of the first input buffer 38 of the first data stream storage agent 22 and the second input buffer 42 of the second data stream storage agent 24 is depicted. The first data stream storage agent 22 is configured to insert an end of stream code EOS and/or a start of stream code SOS in each of the plurality of subparts S1P1, S1P2, S1P2J of each of the first and second parts of the first data stream S1. The second data stream storage agent 24 is configured to insert an end of stream code EOS and/or a start of stream code SOS in each of the plurality of subparts S2P1, S2P2, S2P2J of the first and second parts of the second data stream S2.

The end of stream code EOS in each of the plurality of parts of the first and second data streams S1, S2 may cause the AES-XTS encryption module 18 to terminate the respective encryption session. The start of stream code SOS in each of the plurality of parts of the first and second data streams S1, S2 may cause the AES-XTS encryption module 18 to initiate the respective encryption session.

Figure 7:
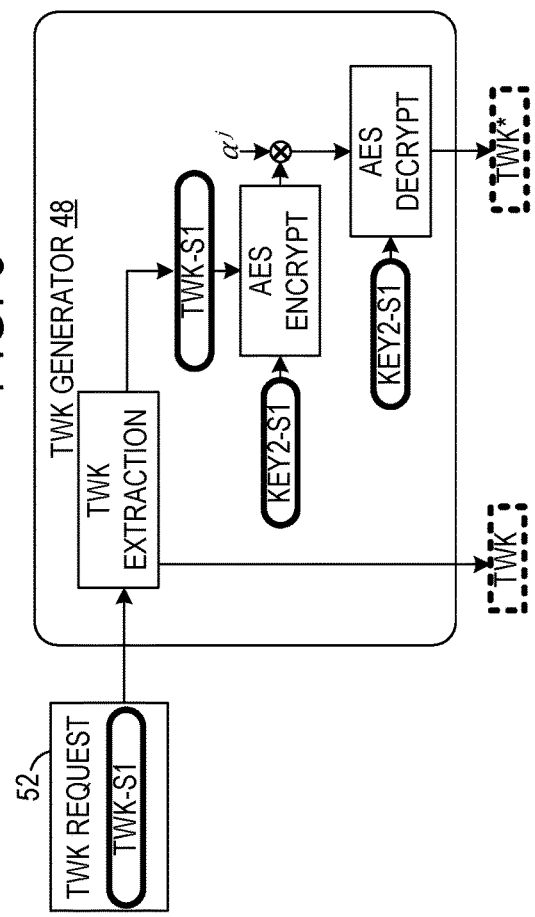
FIG. 7 is a detailed schematic diagram of the first tweak value generator of FIG. 6.

Referring to FIG. 7, the calculations performed by the first tweak value generator 48 are depicted in accordance with the first or second examples of the present disclosure. It will be appreciated the calculations are just one example of many possible calculation methods for obtaining the initial tweak value TWK and subsequent modified tweak values TWK*. It will be noted that calculations performed by the second tweak value generator 50 are performed similarly to the first tweak value generator 48.

The initial tweak value TWK may be provided by the user via the client 1, 2 and included in the first tweak value request 52, the first tweak value TWK extracted from the first tweak value request 52, and subsequent modified tweak values TWK* calculated based on the user-provided initial tweak value TWK and the block cipher index j of the last block cipher of the previously encrypted part of a stream, which may be stored in a stream storage context 28, 30 as described above.

Specifically, the tweak value generator 48 calls an AES encrypt function in an AES-XTS encryption function library available to the tweak value generator 48, and passes to the function the original tweak value (e.g., TWK-S1) and the tweak key (KEY2-S1) used in a prior encryption session to encrypt the first part 1P of the first stream S1. These values are retrieved from the stream storage context 28, 30 discussed previously. Modular multiplication is performed between the encrypted result of this computation and $\alpha^j$, which is a Galois field multiplier comprising α as a primitive element of a Galois field and j as the number of times α is cumulatively multiplied by the tweak value generator 48 to yield a modular product for the jth part S1PJ of the first data stream S1. Finally, the tweak value generator 48 calls an AES decrypt function with parameters including the modular product from the previous step and the tweak key (KEY2-S1). Through this decryption, a value for TWK*-S1 may be obtained for encrypting the part S1PJ+1 of the first data stream S1, for example.

Figure 8:
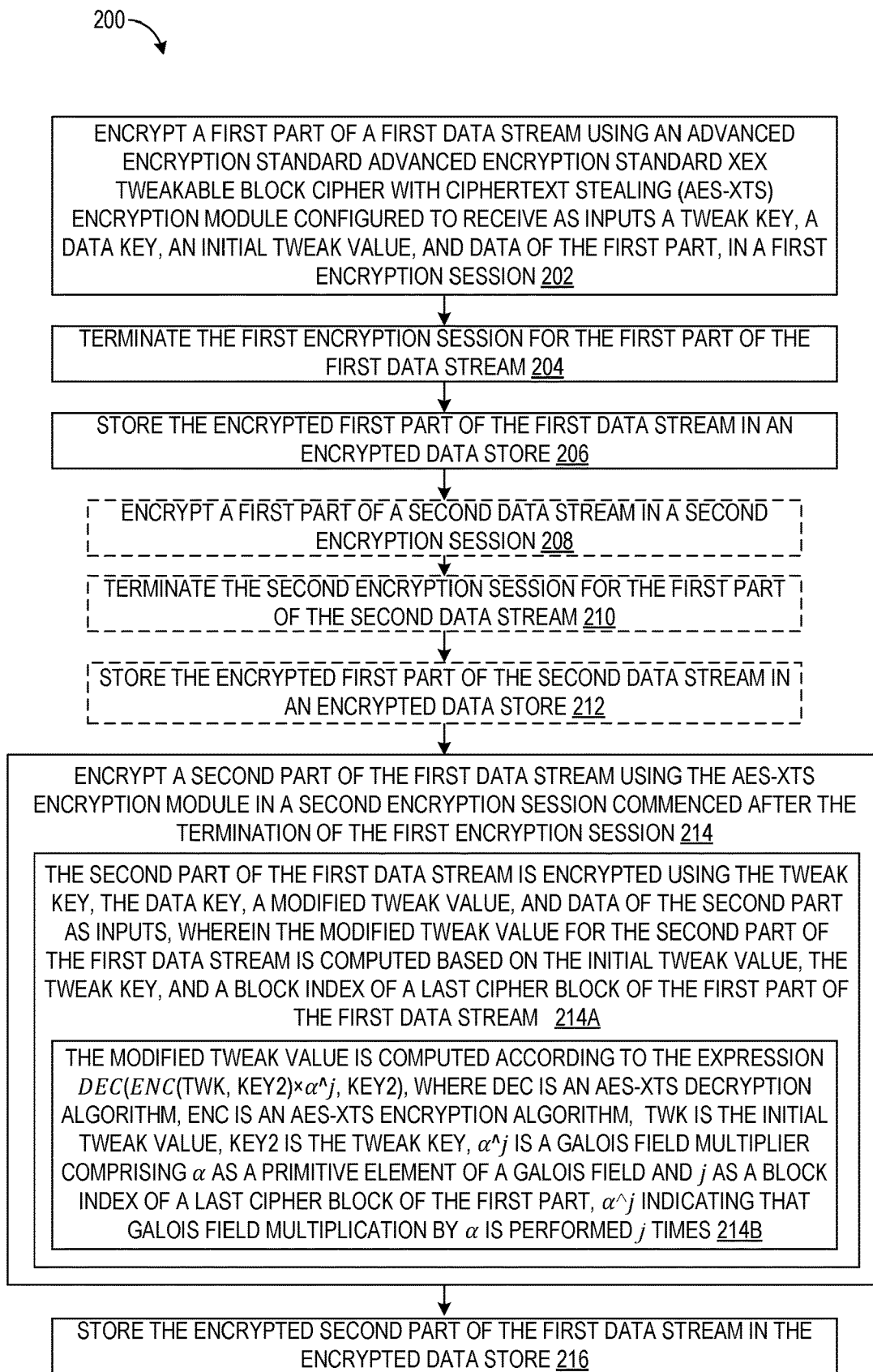
FIG. 8 is a flowchart illustrating a method for incremental AES-XTS encryption according to one example of the present disclosure.

Referring to FIG. 8, a method 200 is described for performing incremental AES-XTS encryption. The method 200 may be used to encrypt two data streams at the same time using an AES-XTS encryption method by interleaving encryption requests for the two data streams. The following description of method 200 is provided with reference to the software and hardware components described above and shown in FIGS. 1-7. It will be appreciated that method 200 also may be performed in other contexts using other suitable hardware and software components.

At step 202, a first part of a first data stream is encrypted using an AES-XTS encryption module configured to receive as inputs a tweak key, a data key, a tweak value, and data of the first part, in a first encryption session, to thereby generate an encrypted first part. At step 204, the first encryption session for the first part of the first data stream is terminated. At step 206, the encrypted first part is stored in an encrypted data store. At step 214, a second part of the first data stream is encrypted using the AES-XTS encryption module in a second encryption session commenced after the termination of the first encryption session. At step 214A with step 214, the second part of the first data stream is encrypted using the tweak key, the data key, a modified tweak value, and data of the second part as inputs to thereby generate an encrypted second part, and the modified tweak value for the second part of the first data stream is computed based on the initial tweak value, the tweak key, and a block index of a last cipher block of the first part of the first data stream. As shown at 214B, the modified tweak value specifically may be computed according to the expression DEC(ENC(TWK, KEY2)×α^j, KEY2), where DEC is an AES decryption algorithm, ENC is an AES encryption algorithm, TWK is the initial tweak value, KEY2 is the tweak key, α^j is a Galois field multiplier comprising a as a primitive element of a Galois field and j as the block index of the last cipher block of the first part, α^j indicating that Galois field multiplication by a is performed j times. At step 216, the encrypted second part is stored in the encrypted data store.

Between steps 206 and 214, steps 208, 210, and 212 may be performed. At step 208, a first part of a second data stream may be encrypted in a second encryption session. At step 210, the second encryption session may be terminated for the first part of the second data stream. At step 212, the encrypted part of the second data stream may be stored in an encrypted data store.

The above-described systems and method may be used to implement incremental AES-XTS encryption configured to interleave requests to encrypt the plurality of parts of the first data stream with encryption requests to encrypt the plurality of parts of the second data stream over a connection to the AES-XTS encryption module. Accordingly, AES-XTS encryption can be implemented in modern distributed systems in which the data is not necessarily stored in the location where it is generated, as well as in computers with multi-core architectures. Incremental encryption also reduces the need for large memory buffers to process the data streams, saving computational resources.

Although the present disclosure has described the systems and methods above using AES-XTS as an example, it will be appreciated that another encryption scheme, such as general AES could be alternatively adopted, and ciphertext stealing need not be employed. In such cases, the terms AES-XTS used throughout shall be understood to be applicable to AES, except where ciphertext stealing is discussed. Furthermore, although the systems and methods above have primarily been described with respect to encryption, it will be understood that they may be utilized during decryption as well, with the operations described for encryption being performed in reverse order.

Figure 9:
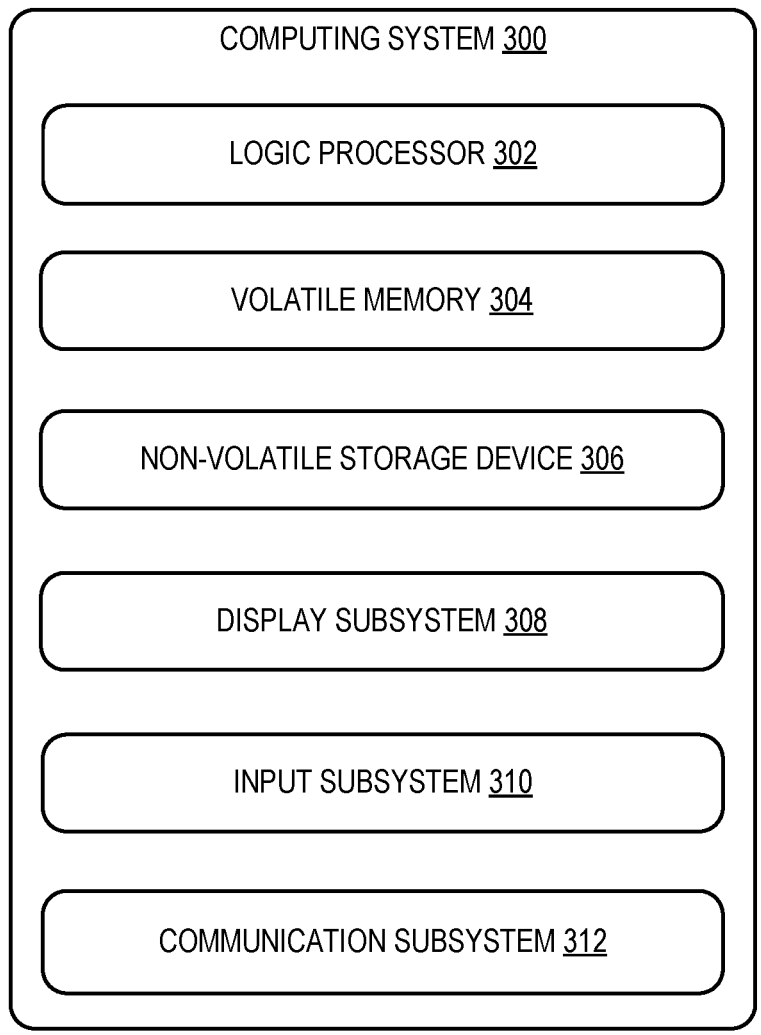
FIG. 9 is a schematic diagram illustrating an exemplary computing system that may be used to implement a computing system of FIG. 3A or 3B.

FIG. 9 schematically shows a non-limiting embodiment of a computing system 300 that can enact one or more of the processes described above. Computing system 300 is shown in simplified form. Computing system 300 may embody the storage server 20 and storage server 120 described above and illustrated in FIGS. 3A and 3B, respectively. Computing system 300 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 300 includes a logic processor 302 volatile memory 304, and a non-volatile storage device 306. Computing system 300 may optionally include a display sub system 308, input sub system 310, communication sub system 312, and/or other components not shown in FIG. 9.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include FPGA, PASIC/ASICs, program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 300 to send and/or receive messages to and/or from other devices via a network such as the Internet.

Figure 10:
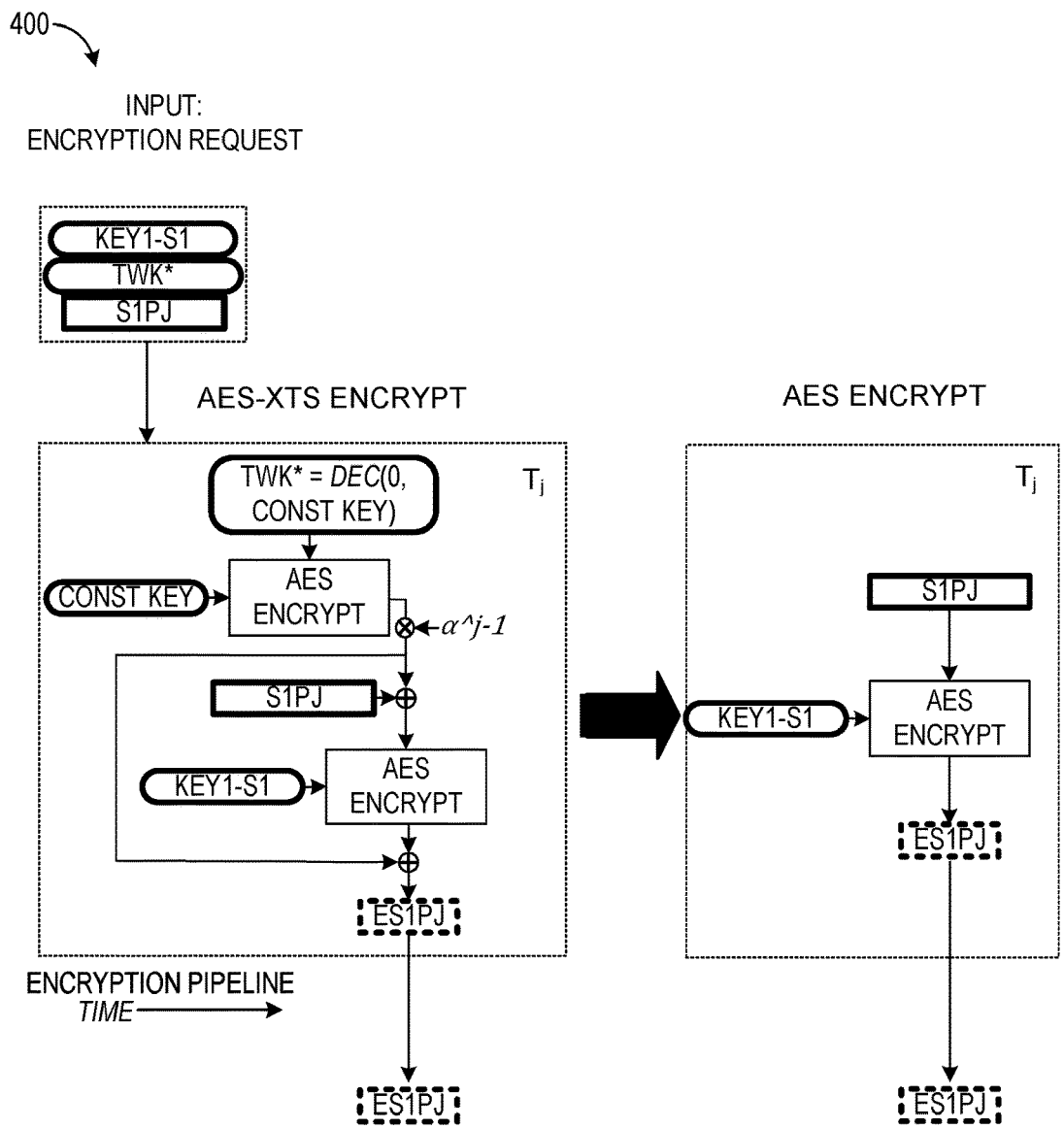
FIG. 10 is a schematic diagram of a modified example of an encryption pipeline of the AES-XTS encryption module of the computing system of FIG. 3A or 3B when operated in an encryption mode that emulates AES encryption with no extended mode of operation, i.e., the Electronic Code Book (ECB) mode of AES encryption.
Figure 10:
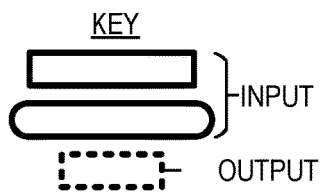

As described in the background, there has arisen the technical problem of performing AES encryption with no extended mode of operation using existing AES-XTS hardware and software. Hereinafter, 'AES encryption with no extended mode of operation' refers to the Electronic Code book (ECB) mode of AES encryption and 'AES decryption with no extended mode of operation' refers to the ECB mode of AES decryption, and not AES encryption and decryption in one of its extended modes of operation including OFB (Output FeedBack mode), CBC (Cipher Block Chaining mode), CFB (Cipher FeedBack mode), and CTR (Counter-mode). To address this technical problem, FIG. 10 illustrates a modified example of an encryption pipeline of the AES-XTS encryption module of the computing system of FIG. 3A or 3B when operated in an encryption mode, in which the tweak value is modified to be specifically computed according to the expression DEC(0, CONST KEY), where DEC is an AES decryption algorithm, TWK is the initial tweak value, CONST KEY is the tweak key which is an arbitrary nonnegative integer constant, and '0' is 16 bytes (128 bits) in length. This configuration enables the AES-XTS hardware to perform AES encryption without an extended mode of operation. Further, since the CONST KEY is constant, the expression DEC(0, CONST KEY) may be computed only once online or offline outside of the AES-XTS encryption module for multiple encryption and decryption sessions, thereby reducing computing resource requirements.

Referring back to FIG. 7, in this example process 400, the modified tweak value may be generated using the tweak value generator 48 using an initial tweak value of zero. A user may send a first tweak value request 52 containing an initial tweak value TWK-S1 of zero to the tweak value generator 48, which calls an AES encrypt function in an AES-XTS encryption function library available to the tweak value generator 48. The initial tweak value TWK-S1 of zero is passed to the AES encrypt function and the tweak key (KEY2-S1) to obtain an encrypted result of zero. Modular multiplication is performed between this encrypted result of zero and $\alpha^j$, which is a Galois field multiplier comprising $\alpha$ as a primitive element of a Galois field and j as the number of times $\alpha$ is cumulatively multiplied by the tweak value generator 48 to yield a modular product, which is also zero. Finally, the tweak value generator 48 calls an AES decrypt function with parameters including the modular product from the previous step and the tweak key (KEY2-S1), which is modified to be set to CONST KEY. Through this decryption, the modified tweak value may be obtained for encrypting the part S1PJ+1 of the first data stream S1, for example.

Although the tweak key KEY2-S1 inputted into the AES encrypt function is the same as the tweak key KEY2-S1 which is modified to be set to CONST KEY and inputted into the AES decrypt function in this example, it will be appreciated that, alternatively, the tweak key KEY2-S1 inputted into the AES encrypt function may be different from the tweak key KEY2-S1 or CONST KEY which is inputted into the AES decrypt function.

Referring back to FIG. 10, in the encryption pipeline of this example, the modified tweak value TWK* of DEC(0, CONST KEY) is passed to the AES encrypt function and the tweak key CONST KEY to obtain an encrypted result of zero. Modular multiplication is performed between this encrypted result of zero and $\alpha\hat{\,}j-1$, which is a Galois field multiplier comprising α as a primitive element of a Galois field and j−1 as the number of times α is cumulatively multiplied to yield a modular product, which is also zero. Addition over a Galois field is then performed between the modular product of zero and the jth part S1PJ of a first data stream S1 to yield an unchanged jth part S1PJ of the first data stream S1. The jth part S1PJ of the first data stream S1 is passed to the AES encrypt function and the data key KEY1-S1 to yield an encrypted result. Addition over a Galois field is then performed between this encrypted result and the modular product of zero to obtain the encrypted subpart ES1PJ. The encrypted subpart ES1PJ is thereby formatted according to the Advanced Encryption Standard with no extended mode and not according to the XEX Based Tweaked Codebook Mode with Ciphertext Stealing.

It will be appreciated that, although FIG. 10 describes the use of the encryption pipeline in the context of incremental data stream encryption, it will be appreciated that this encryption pipeline may also be applied in other applications, including standalone single block AES encryption with no extended mode of operation to encrypt one block of data with no extended mode of operation applied. In such an example, the modified tweak value TWK* of DEC(0, CONST KEY) is passed to the AES encrypt function and the tweak key CONST KEY to obtain an encrypted result of zero. Modular multiplication is performed between this encrypted result of zero and $\alpha\hat{\,}j-1$ which is a Galois field multiplier using j as an arbitrary integer and α as a primitive element of a Galois field and j−1 as the number of times α is cumulatively multiplied to yield a modular product, which is also zero. The integer j relates to a single jth block of an encryption session or a data stream. Addition over a Galois field is then performed between the modular product of zero and a block of data to yield an unchanged block of data. The block of data is passed to the AES encrypt function and the data key KEY1-S1 to yield an encrypted result. Addition over a Galois field is then performed between this encrypted result and the modular product of zero to obtain an encrypted block of data. The encrypted block of data is thereby formatted according to the Advanced Encryption Standard with no extended mode and not according to the XEX Based Tweaked Codebook Mode with Ciphertext Stealing.

A shown on the right side of FIG. 10, by modifying the tweak value to be specifically computed according to the expression DEC(0, CONST KEY), the AES-XTS encryption process is converted into an AES encryption process with no extended mode of operation, which passes a text stream part to an AES encrypt function and a data key to obtain an encrypted text stream part corresponding to the original text stream part.

Figure 11:
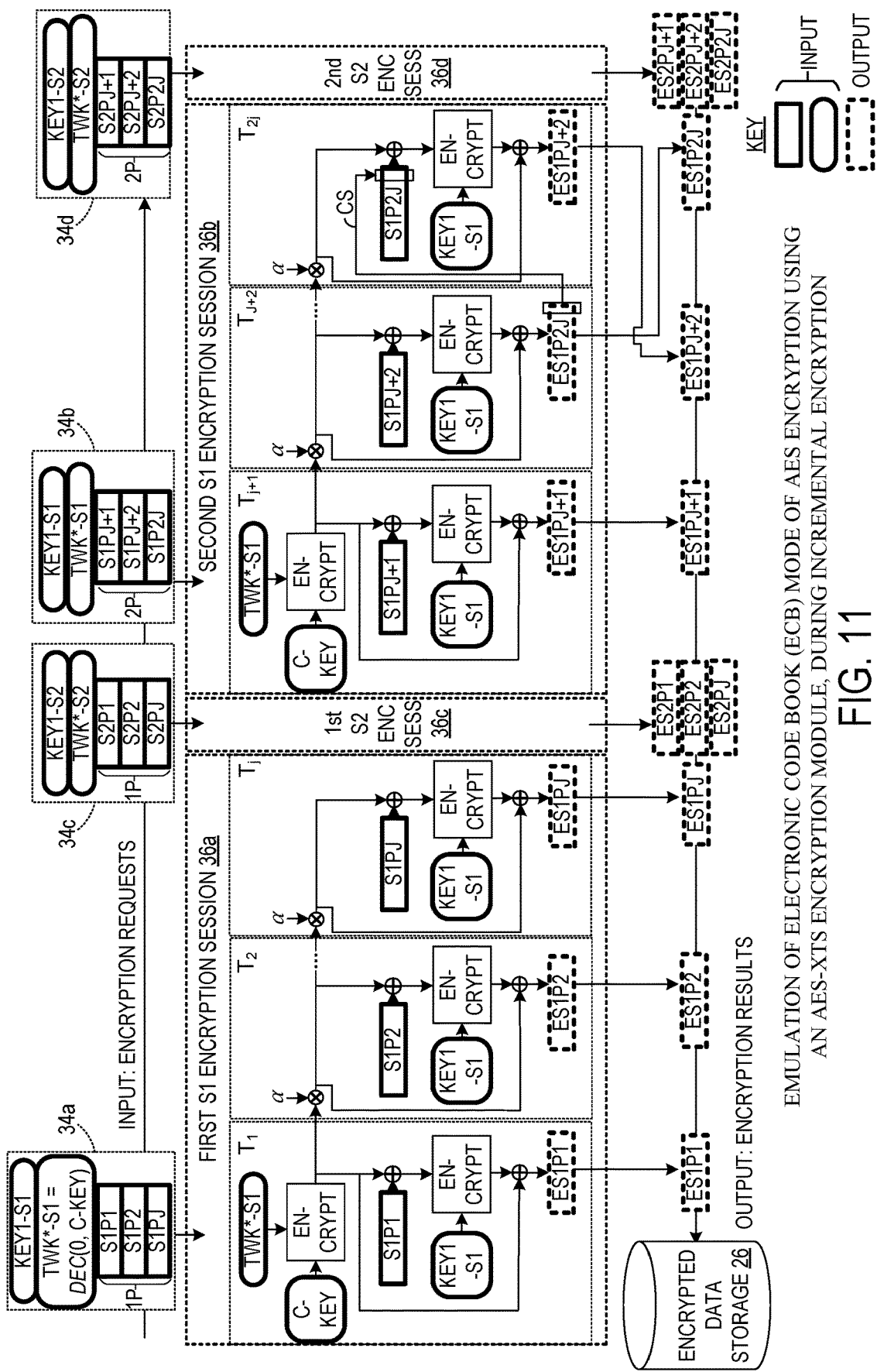
FIG. 11 is a schematic diagram of a modified example of data flows through the AES-XTS encryption module of the computing system of FIG. 3A or 3B when operated in the encryption mode of FIG. 10.

FIG. 11 shows a detailed depiction of the data flows through the AES-XTS encryption module 18 when operated in an AES encryption mode with no extended mode of operation, in accordance with the first or second example of the present disclosure, in which similar modifications are applied as in the example of FIG. 10 to modify the tweak value to be specifically computed according to the expression DEC(0, C-KEY), where DEC is an AES decryption algorithm, TWK is the initial tweak value, and C-KEY is the tweak key which is an arbitrary nonnegative integer.

Since the rest of the description of FIG. 11 is substantially similar to the description of FIG. 4A with the exception of the above-described modifications, the detailed description thereof is abbreviated here for the sake of brevity. It is to be noted that like parts are designated by like reference numerals throughout the detailed description and the accompanying drawings. It will be appreciated, by making the above modifications to the encryption process of FIG. 4A, the encryption process may be converted from an AES-XTS encryption process to a AES encryption process with no extended mode of operation.

Figure 12:
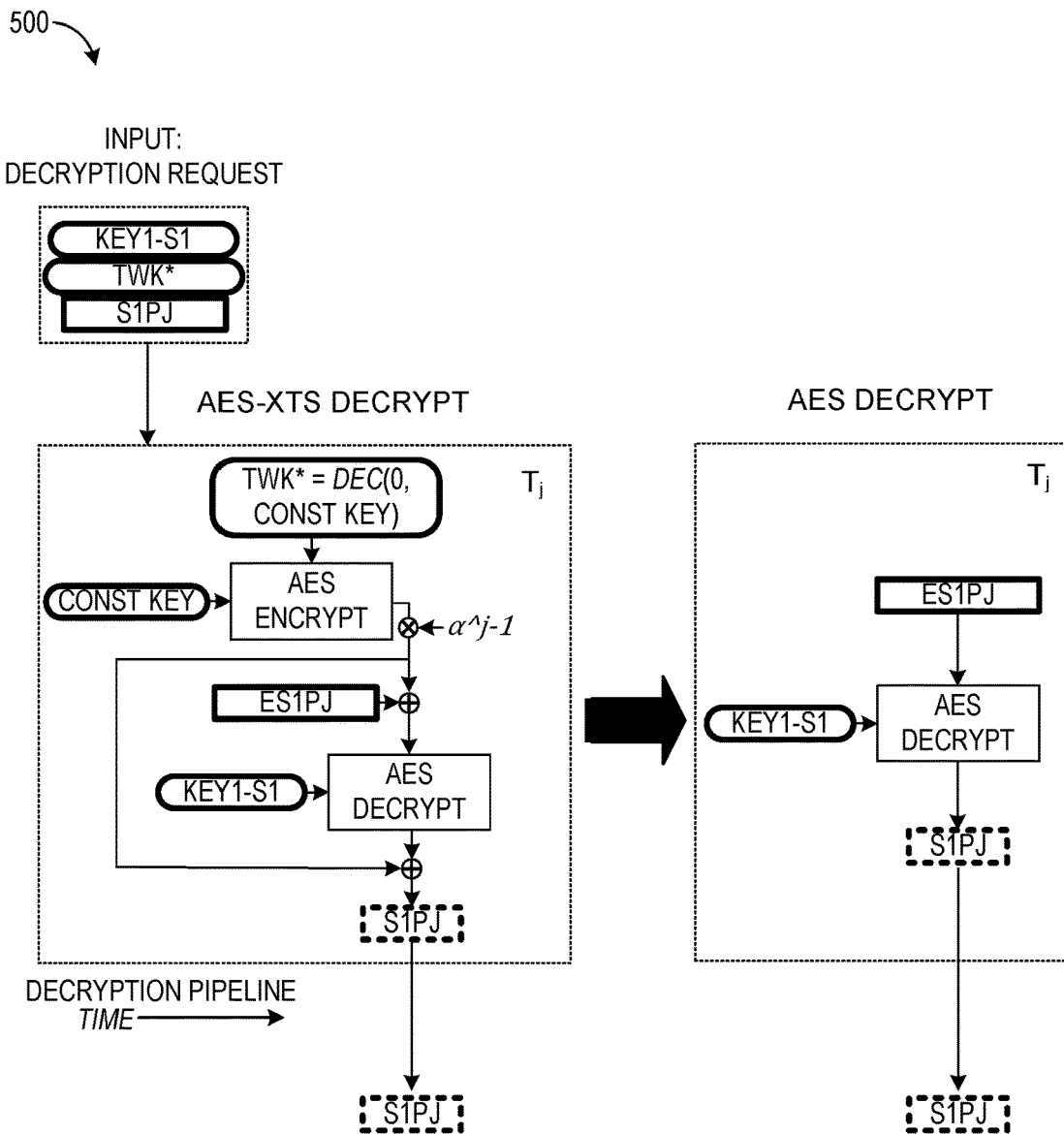
FIG. 12 is a schematic diagram of a modified example of a decryption pipeline of the AES-XTS encryption module of the computing system of FIG. 3A or 3B when operated in a decryption mode that emulates AES encryption with no extended mode of operation, i.e., the Electronic Code Book (ECB) mode of AES encryption.
Figure 12:
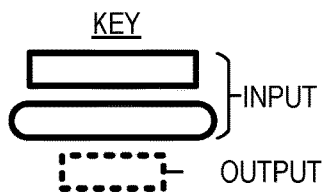

FIG. 12 illustrates a modified example of a decryption pipeline of the AES-XTS encryption module of the computing system of FIG. 3A or 3B when operated in a decryption mode with no extended mode of operation, in which the tweak value is modified to be specifically computed according to the expression DEC(0, CONST KEY), where DEC is an AES decryption algorithm, TWK is the initial tweak value, and CONST KEY is the tweak key which is an arbitrary nonnegative integer.

In the decryption pipeline of this example process 500, the modified tweak value TWK* of DEC(0, CONST KEY) is passed to the AES encrypt function and the tweak key CONST KEY to obtain an encrypted result of zero. Modular multiplication is performed between this encrypted result of zero and $\alpha\hat{\,}j-1$, which is a Galois field multiplier comprising α as a primitive element of a Galois field and j−1 as the number of times α is cumulatively multiplied to yield a modular product, which is also zero. Addition over a Galois field is then performed between the modular product of zero and the encrypted jth part S1PJ of a first data stream S1 to yield an unchanged encrypted jth part S1PJ of the first data stream S1. The encrypted jth part S1PJ of the first data stream S1 is passed to the AES decrypt function and the data key KEY1-S1 to yield a decrypted result. Addition over a Galois field is then performed between this decrypted result and the modular product of zero to obtain the decrypted subpart S1PJ.

It will be appreciated that, although FIG. 12 describes the use of the decryption pipeline in the context of incremental data stream decryption, it will be appreciated that this decryption pipeline may also be applied in other applications, including standalone single block AES decryption with no extended mode of operation. In such an example, the modified tweak value TWK* of DEC(0, CONST KEY) is passed to the AES encrypt function and the tweak key CONST KEY to obtain an encrypted result of zero. Modular multiplication is performed between this encrypted result of zero and $\alpha\hat{\,}j-1$ which is a Galois field multiplier using j as an arbitrary integer and α as a primitive element of a Galois field and j−1 as the number of times α is cumulatively multiplied to yield a modular product, which is also zero. The integer j relates to a single jth block of a decryption session or a data stream. Addition over a Galois field is then performed between the modular product of zero and an encrypted block of data to yield an unchanged encrypted block of data. The encrypted block of data is passed to the AES decrypt function and the data key KEY1-S1 to yield an decrypted result. Addition over a Galois field is then performed between this decrypted result and the modular product of zero to obtain a decrypted block of data.

A shown on the right side of FIG. 12, by modifying the tweak value to be specifically computed according to the expression DEC(0, CONST KEY), the AES-XTS decryption process is converted into an AES decryption process with no extended mode of operation, which includes passing an encrypted text stream part to an AES decrypt function and a data key to obtain a decrypted text stream part corresponding to the original encrypted text stream part.

Figure 13:
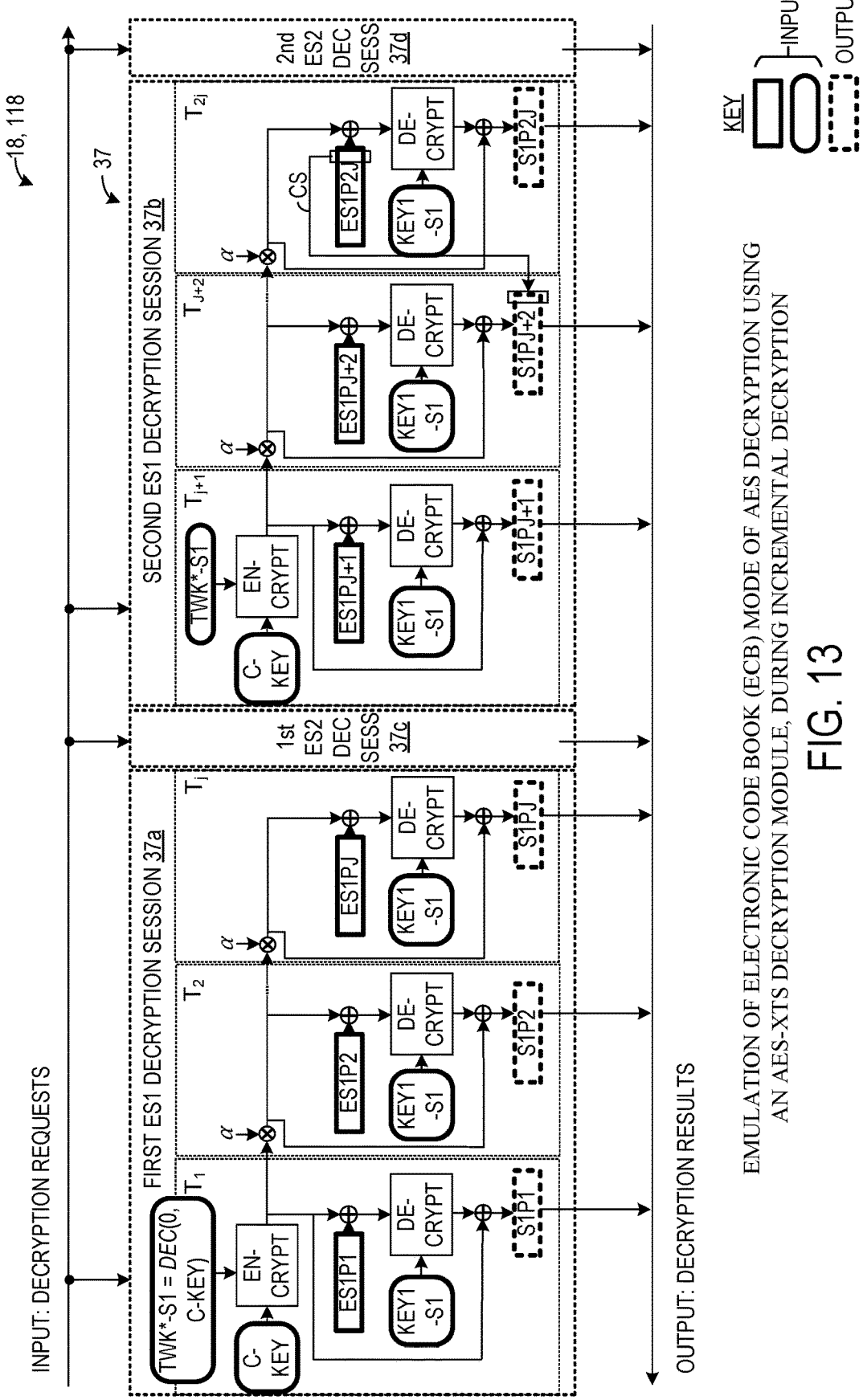
FIG. 13 is a schematic diagram of a modified example of data flows through the AES-XTS encryption module of the computing system of FIG. 3A or 3B when operated in the decryption mode of FIG. 12.

FIG. 13 shows a detailed depiction of the data flows through the AES-XTS encryption module 18 when operated in a decryption mode with no extended mode of operation, in accordance with the first or second example of the present disclosure, in which similar modifications are applied as in the example of FIG. 10 to modify the tweak value to be specifically computed according to the expression DEC(0, CONST KEY), where DEC is an AES decryption algorithm, TWK is the initial tweak value, and CONST KEY is the tweak key which is an arbitrary nonnegative integer.

Since the rest of the description of FIG. 13 is substantially similar to the description of FIG. 4B with the exception of the above-described modifications, the detailed description thereof is abbreviated here for the sake of brevity. It is to be noted that like parts are designated by like reference numerals throughout the detailed description and the accompanying drawings. It will be appreciated, by making the above modifications to the decryption process of FIG. 4B, the decryption process may be converted from an AES-XTS decryption process to a AES decryption process with no extended mode of operation.

Although the above paragraphs describe the use of the AES-XTS encryption subsystem in incremental data stream encryption and decryption, it will be appreciated that this invention may also be applied in other applications which use existing AES-XTS architecture to perform other encryption and decryption processes, including standalone single block AES encryption and decryption processes with no extended mode of operation.

The following paragraphs provide additional support for the claims of the subject application. One aspect provides a computing system, comprising processing circuitry configured to execute an Advanced Encryption Standard XEX Based Tweaked Codebook Mode with Ciphertext Stealing (AES-XTS) encryption subsystem configured to encrypt a block of data using an AES-XTS encryption module configured to receive as inputs a tweak key, a data key, a modified tweak value, and the block of data, to thereby generate an encrypted block of data, the modified tweak value being computed according to the expression DEC(0, CONST KEY), DEC being an AES decryption algorithm, and CONST KEY being the tweak key, and the encrypted block of data being thereby formatted according to the Advanced Encryption Standard with no extended mode and not according to the XEX Based Tweaked Codebook Mode with Ciphertext Stealing. In this aspect, additionally or alternatively, the modified tweak value is computed outside of the AES-XTS encryption module. In this aspect, additionally or alternatively, the AES-XTS encryption subsystem is configured to encrypt a block of data with no extended mode of operation applied. In this aspect, additionally or alternatively, the AES-XTS encryption subsystem is configured to encrypt a block of data with an Electronic Code book (ECB) mode of operation applied. In this aspect, additionally or alternatively, the block of data is a first part of a first data stream, the encrypted block of data is an encrypted first part, the processing circuitry is configured to execute the AES-XTS encryption subsystem as an incremental AES-XTS encryption subsystem to encrypt the first part of the first data stream in a first encryption session including one or more cipher blocks, to thereby generate the encrypted first part, terminate the first encryption session for the first part, store the encrypted first part in an encrypted data store, and encrypt a second part of the first data stream using the AES-XTS encryption module in a second encryption session commenced after the termination of the first encryption session to thereby generate an encrypted second part, and store the encrypted second part in the encrypted data store, and the second part of the first data stream is encrypted using the tweak key, the data key, the modified tweak value, and data of the second part as inputs to thereby generate the encrypted second part. In this aspect, additionally or alternatively, the incremental AES-XTS encryption subsystem is further configured to store a context of the first encryption session for the first part after termination of the first encryption session, and read the stored context of the first encryption session prior to the second encryption session to thereby retrieve the tweak key and the data key for the second encryption session. In this aspect, additionally or alternatively, the incremental AES-XTS encryption subsystem includes a stream storage module and the AES-XTS encryption module, and the stream storage module is configured to interleave requests for encryption of respective parts of the first data stream and a second data stream together over a connection to the AES-XTS encryption module. In this aspect, additionally or alternatively, the stream storage module includes a first data stream storage agent configured to receive the first data stream and divide the first data stream into a plurality of parts of which the first part is one part, and a second data stream storage agent configured to receive the second data stream and divide the second data stream into a plurality of parts, the stream storage module is configured to interleave requests to encrypt the plurality of parts of the first data stream with encryption requests to encrypt the plurality of parts of the second data stream over a connection to the AES-XTS encryption module, and the AES-XTS encryption module is configured to process the plurality of encryption requests serially in an order received. In this aspect, additionally or alternatively, the stream storage module is configured to receive interleaved responses to the encryption requests over the connection to the AES-XTS encryption module.

Another aspect provides a computing method for incremental Advanced Encryption Standard XEX Based Tweaked Codebook Mode with Ciphertext Stealing (AES-XTS) encryption, comprising encrypting a block of data using an AES-XTS encryption module configured to receive as inputs a tweak key, a data key, a modified tweak value, and the block of data, to thereby generate an encrypted block of data, the modified tweak value being computed according to the expression DEC(0, CONST KEY), DEC being an AES decryption algorithm, and CONST KEY being the tweak key, and the encrypted block of data being thereby formatted according to the Advanced Encryption Standard with no extended mode and not according to the XEX Based Tweaked Codebook Mode with Ciphertext Stealing. In this aspect, additionally or alternatively, the modified tweak value is computed outside of the AES-XTS encryption module. In this aspect, additionally or alternatively, the AES-XTS encryption subsystem is configured to encrypt a block of data with no extended mode of operation applied. In this aspect, additionally or alternatively, the AES-XTS encryption subsystem is configured to encrypt a block of data with an Electronic Code book (ECB) mode of operation applied. In this aspect, additionally or alternatively, the block of data is a first part of a first data stream, the encrypted block of data is an encrypted first part, the AES-XTS encryption subsystem is executed as an incremental AES-XTS encryption subsystem to encrypt the first part of the first data stream in a first encryption session including one or more cipher blocks, to thereby generate the encrypted first part, terminate the first encryption session for the first part, store the encrypted first part in an encrypted data store, and encrypt a second part of the first data stream using the AES-XTS encryption module in a second encryption session commenced after the termination of the first encryption session to thereby generate an encrypted second part, and store the encrypted second part in the encrypted data store, and the second part of the first data stream is encrypted using the tweak key, the data key, the modified tweak value, and data of the second part as inputs to thereby generate the encrypted second part. In this aspect, additionally or alternatively, the method further comprises storing a context of the first encryption session for the first part after termination of the first encryption session, and reading the stored context of the first encryption session prior to the second encryption session to thereby retrieve the tweak key and the data key for the second encryption session. In this aspect, additionally or alternatively, the method further comprises interleaving, via a stream storage module, requests for encryption of respective parts of the first data stream and a second data stream together over a connection to the AES-XTS encryption module. In this aspect, additionally or alternatively, the method further comprises receiving the first data stream and dividing the first data stream into a plurality of parts of which the first part is one part, receiving the second data stream and dividing the second data stream into a plurality of parts, interleaving requests via the stream storage module to encrypt the plurality of parts of the first data stream with requests to encrypt the plurality of parts of the second data stream over a connection to the AES-XTS encryption module, and processing the plurality of requests serially in an order received via the AES-XTS encryption module. In this aspect, additionally or alternatively, the method further comprises receiving, at the stream storage module, interleaved responses to the encryption requests over the connection to the AES-XTS encryption module. In this aspect, additionally or alternatively, the method further comprises inserting, via a first data stream storage agent, an end of stream code in each of the plurality of parts of the first data stream, inserting, via a second data stream storage agent, an end of stream code in each of the plurality of parts of the second data stream, and terminating, via the AES-XTS encryption module, the respective encryption session in response to the end of stream code in each of the plurality of parts of the first data stream and the second data stream.

Another aspect provides a computing system, comprising processing circuitry configured to execute an Advanced Encryption Standard XEX Based Tweaked Codebook Mode with Ciphertext Stealing (AES-XTS) encryption subsystem configured to encrypt a block of data using an AES-XTS encryption module configured to receive as inputs a tweak key, a data key, a modified tweak value, and the block of data, to thereby generate an encrypted block of data, the modified tweak value being computed according to the expression DEC(0, CONST KEY), DEC being an AES decryption algorithm, and CONST KEY being the tweak key, and the encrypted block of data being thereby formatted according to the Advanced Encryption Standard with no extended mode and not according to the XEX Based Tweaked Codebook Mode with Ciphertext Stealing.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

Further, it will be appreciated that the terms "includes," "including," "has," "contains," variants thereof, and other similar words used in either the detailed description or the claims are intended to be inclusive in a manner similar to the term "comprising" as an open transition word without precluding any additional or other elements.

It will be appreciated that "and/or" as used herein refers to the logical disjunction operation, and thus A and/or B has the following truth table.

| A | B | A and/or B |
|---|---|------------|
| T | T | T |
| T | F | T |
| F | T | T |
| F | F | F |

The invention claimed is:

1. A computing system, comprising:
processing circuitry configured to execute an Advanced Encryption Standard XEX Based Tweaked Codebook Mode with Ciphertext Stealing (AES-XTS) encryption subsystem configured to:
encrypt a block of data using an AES-XTS encryption module configured to receive as inputs a tweak key, a data key, a modified tweak value, and the block of data, to thereby generate an encrypted block of data, wherein
the modified tweak value is computed according to the expression DEC(0, CONST KEY), wherein
DEC is an AES decryption algorithm, and
CONST KEY is the tweak key; and
the encrypted block of data is thereby formatted according to the Advanced Encryption Standard (AES) with no extended mode and not according to the XEX Based Tweaked Codebook Mode with Ciphertext Stealing, thereby emulating the AES encryption with Electronic Code Book (ECB) mode and no extended mode using the AES-XTS encryption subsystem, wherein
the modified tweak value is computed outside of the AES-XTS encryption subsystem.

2. The computing system of claim 1, wherein the AES-XTS encryption subsystem is configured to encrypt a block of data with no extended mode of operation applied.

3. The computing system of claim 2, wherein the AES-XTS encryption subsystem is configured to encrypt a block of data with an Electronic Code book (ECB) mode of operation applied.

4. The computing system of claim 1, wherein
the block of data is a first part of a first data stream;
the encrypted block of data is an encrypted first part;
the processing circuitry is configured to execute the AES-XTS encryption subsystem as an incremental AES-XTS encryption subsystem to:
  encrypt the first part of the first data stream in a first encryption session including one or more cipher blocks, to thereby generate the encrypted first part;
  terminate the first encryption session for the first part;
  store the encrypted first part in an encrypted data store; and
  encrypt a second part of the first data stream using the AES-XTS encryption module in a second encryption session commenced after the termination of the first encryption session to thereby generate an encrypted second part; and
  store the encrypted second part in the encrypted data store; and
the second part of the first data stream is encrypted using the tweak key, the data key, the modified tweak value, and data of the second part as inputs to thereby generate the encrypted second part.

5. The computing system of claim 4, wherein the incremental AES-XTS encryption subsystem is further configured to:
store a context of the first encryption session for the first part after termination of the first encryption session; and
read the stored context of the first encryption session prior to the second encryption session to thereby retrieve the tweak key and the data key for the second encryption session.

6. The computing system of claim 4, wherein
the incremental AES-XTS encryption subsystem includes a stream storage module and the AES-XTS encryption module; and
the stream storage module is configured to interleave requests for encryption of respective parts of the first data stream and a second data stream together over a connection to the AES-XTS encryption module.

7. The computing system of claim 6, wherein
the stream storage module includes:
  a first data stream storage agent configured to receive the first data stream and divide the first data stream into a plurality of parts of which the first part is one part, and
  a second data stream storage agent configured to receive the second data stream and divide the second data stream into a plurality of parts;
the stream storage module is configured to interleave requests to encrypt the plurality of parts of the first data stream with encryption requests to encrypt the plurality of parts of the second data stream over a connection to the AES-XTS encryption module, and
the AES-XTS encryption module is configured to process the plurality of encryption requests serially in an order received.

8. The computing system of claim 7, wherein the stream storage module is configured to receive interleaved responses to the encryption requests over the connection to the AES-XTS encryption module.

9. A computing method for incremental Advanced Encryption Standard XEX Based Tweaked Codebook Mode with Ciphertext Stealing (AES-XTS) encryption, comprising:
encrypting a block of data using an AES-XTS encryption module configured to receive as inputs a tweak key, a data key, a modified tweak value, and the block of data, to thereby generate an encrypted block of data, wherein
the modified tweak value is computed according to the expression DEC(0, CONST KEY), wherein
DEC is an AES decryption algorithm, and
CONST KEY is the tweak key; and
the encrypted block of data is thereby formatted according to the Advanced Encryption Standard (AES) with no extended mode and not according to the XEX Based Tweaked Codebook Mode with Ciphertext Stealing, thereby emulating the AES encryption with Electronic Code Book (ECB) mode and no extended mode using the AES-XTS encryption module, wherein
the modified tweak value is computed outside of the AES-XTS encryption module.

10. The computing method of claim 9, wherein the AES-XTS encryption subsystem is configured to encrypt a block of data with no extended mode of operation applied.

11. The computing method of claim 10, wherein the AES-XTS encryption subsystem is configured to encrypt a block of data with an Electronic Code book (ECB) mode of operation applied.

12. The computing method of claim 9, wherein
the block of data is a first part of a first data stream;
the encrypted block of data is an encrypted first part;
the AES-XTS encryption subsystem is executed as an incremental AES-XTS encryption subsystem to:
  encrypt the first part of the first data stream in a first encryption session including one or more cipher blocks, to thereby generate the encrypted first part;
  terminate the first encryption session for the first part;
  store the encrypted first part in an encrypted data store; and
  encrypt a second part of the first data stream using the AES-XTS encryption module in a second encryption session commenced after the termination of the first encryption session to thereby generate an encrypted second part; and
  store the encrypted second part in the encrypted data store; and
the second part of the first data stream is encrypted using the tweak key, the data key, the modified tweak value, and data of the second part as inputs to thereby generate the encrypted second part.

13. The computing method of claim 12, further comprising:
storing a context of the first encryption session for the first part after termination of the first encryption session; and
reading the stored context of the first encryption session prior to the second encryption session to thereby retrieve the tweak key and the data key for the second encryption session.

14. The computing method of claim 12, further comprising:
interleaving, via a stream storage module, requests for encryption of respective parts of the first data stream and a second data stream together over a connection to the AES-XTS encryption module.

15. The computing method of claim 14, further comprising:
receiving the first data stream and dividing the first data stream into a plurality of parts of which the first part is one part;

receiving the second data stream and dividing the second data stream into a plurality of parts;

interleaving requests via the stream storage module to encrypt the plurality of parts of the first data stream with requests to encrypt the plurality of parts of the second data stream over a connection to the AES-XTS encryption module; and processing the plurality of requests serially in an order received via the AES-XTS encryption module.

16. The computing method of claim 15, further comprising:

receiving, at the stream storage module, interleaved responses to the encryption requests over the connection to the AES-XTS encryption module.

17. The computing method of claim 15, further comprising:

inserting, via a first data stream storage agent, an end of stream code in each of the plurality of parts of the first data stream;

inserting, via a second data stream storage agent, an end of stream code in each of the plurality of parts of the second data stream; and terminating, via the AES-XTS encryption module, the respective encryption session in response to the end of stream code in each of the plurality of parts of the first data stream and the second data stream.

18. A computing system, comprising:

processing circuitry configured to execute:

an Advanced Encryption Standard XEX Based Tweaked Codebook Mode with Ciphertext Stealing (AES-XTS) encryption subsystem configured to:

encrypt a block of data using an AES-XTS encryption module configured to receive as inputs a tweak key, a data key, a modified tweak value, and the block of data, to thereby generate an encrypted block of data, wherein the modified tweak value is computed according to the expression DEC(0, CONST KEY), wherein DEC is an AES decryption algorithm, and CONST KEY is the tweak key; and the encrypted block of data is thereby formatted according to the Advanced Encryption Standard (AES) with no extended mode and not according to the XEX Based Tweaked Codebook Mode with Ciphertext Stealing, thereby emulating the AES encryption with Electronic Code Book (ECB) mode and no extended mode using the AES-XTS encryption subsystem, wherein the modified tweak value is computed outside of the AES-XTS encryption subsystem.

* * * * *